US011960589B2

(12) United States Patent
Ollivier

(10) Patent No.: US 11,960,589 B2
(45) Date of Patent: *Apr. 16, 2024

(54) SYSTEM FOR AND METHOD OF AUTHENTICATING A COMPONENT OF AN ELECTRONIC DEVICE

(71) Applicant: Apple Inc., Cupertino, CA (US)

(72) Inventor: Julien Ollivier, Montreal (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,507

(22) Filed: Jun. 14, 2022

(65) Prior Publication Data

US 2022/0318367 A1 Oct. 6, 2022

Related U.S. Application Data

(63) Continuation of application No. 16/320,162, filed as application No. PCT/IB2017/054441 on Jul. 21, 2017, now Pat. No. 11,372,964.

(Continued)

(51) Int. Cl.
*G06F 21/44* (2013.01)
*G06F 21/64* (2013.01)
(Continued)

(52) U.S. Cl.
CPC .............. *G06F 21/44* (2013.01); *G06F 21/64* (2013.01); *G06F 21/71* (2013.01); *G06F 21/74* (2013.01); *H04L 9/3226* (2013.01)

(58) Field of Classification Search
CPC .......... G06F 21/44; G06F 21/64; G06F 21/71; G06F 21/74; H04L 9/3226
See application file for complete search history.

(56) References Cited

U.S. PATENT DOCUMENTS 6,032,257 A    2/2000  Olarig et al.
6,065,679 A    5/2000  Levie et al.
(Continued)

FOREIGN PATENT DOCUMENTS

AU    2016380914 A1    7/2018
EP       0387599 B1    9/1995
WO    2017115174 A1    7/2017

OTHER PUBLICATIONS

Shen Teh et al., "A Survey on Touch Dynamics Authentication in Mobile Devices", Computers & Security, vol. 59, Mar. 18, 2015, p. 210-235 (Year: 2015).*

(Continued)

*Primary Examiner* — Carl G Colin
*Assistant Examiner* — Zhe Liu
(74) *Attorney, Agent, or Firm* — Kilpatrick Townsend & Stockton LLP

(57) ABSTRACT

A method and system for generating an encrypted and authenticated message for authenticating a first component of an electronic device as the originator of the message are disclosed. The method and system comprise encrypting a block of information based on a key associated with a second component of the electronic device to generate an encrypted block of information; accessing, from a memory of the first component, a previous version of a dynamic unique key, the previous version of the dynamic unique key being at least partially based on a original unique key; generating a current version of the dynamic unique key based on the previous version of the dynamic unique key; generating a message authentication code based on the encrypted block of information and the current version of the first dynamic unique key; and transmitting, to the second component, the encrypted block of information and the message authentication code.

21 Claims, 6 Drawing Sheets

Related U.S. Application Data

(60) Provisional application No. 62/366,281, filed on Jul. 25, 2016.

(51) Int. Cl.
  *G06F 21/71* (2013.01)
  *G06F 21/74* (2013.01)
  *H04L 9/32* (2006.01)

(56) References Cited

U.S. PATENT DOCUMENTS

| | | | |
|---|---|---|---|
| 7,502,933 B2 | 3/2009 | Jakobsson et al. | |
| 7,607,012 B2 | 10/2009 | Nyberg | |
| 7,941,666 B2 | 5/2011 | Kocher | |
| 8,108,678 B1 | 1/2012 | Boyen | |
| 9,306,741 B1 | 4/2016 | Brainard | |
| 9,773,240 B1 | 9/2017 | Mccauley | |
| 2001/0002929 A1* | 6/2001 | Mache | H04L 63/0442 380/247 |
| 2004/0017913 A1* | 1/2004 | Hawkes | H04L 9/0637 380/37 |
| 2004/0019785 A1 | 1/2004 | Hawkes et al. | |
| 2004/0172535 A1* | 9/2004 | Jakobsson | G07F 7/1008 713/168 |
| 2006/0020559 A1 | 1/2006 | Steinmetz | |
| 2007/0245147 A1 | 10/2007 | Okeya | |
| 2008/0133921 A1 | 6/2008 | Yao | |
| 2008/0137861 A1 | 6/2008 | Lindmo et al. | |
| 2008/0148186 A1 | 6/2008 | Krishnamurthy | |
| 2008/0288778 A1 | 11/2008 | Skorve et al. | |
| 2009/0222664 A1 | 9/2009 | Cho et al. | |
| 2010/0217985 A1 | 8/2010 | Fahrny et al. | |
| 2011/0219459 A1 | 9/2011 | Andreasson | |
| 2013/0173928 A1 | 7/2013 | Kocher et al. | |
| 2014/0133656 A1* | 5/2014 | Wurster | H04W 4/023 380/270 |
| 2015/0154006 A1 | 6/2015 | Yang et al. | |
| 2015/0156176 A1 | 6/2015 | Collinge et al. | |
| 2015/0199039 A1 | 7/2015 | Hofmann et al. | |
| 2015/0254677 A1 | 9/2015 | Huxham et al. | |
| 2016/0020903 A1* | 1/2016 | de Perthuis | H04L 9/0637 380/44 |
| 2016/0246522 A1* | 8/2016 | Krishnamachari | H04L 67/1097 |
| 2017/0011394 A1 | 1/2017 | Kumar et al. | |
| 2019/0147159 A1* | 5/2019 | Eisen | G06K 7/1443 726/17 |

OTHER PUBLICATIONS

Corrected Notice of Allowability issued in U.S. Appl. No. 16/320,162, dated Mar. 31, 2022 in 2 pages (of-record in parent application).
Final Office Action issued in U.S. Appl. No. 16/320,162, dated Sep. 16, 2021 in 24 pages (of-record in parent application).
Non Final Office Action issued in U.S. Appl. No. 16/320,162, dated Feb. 2, 2021 in 23 pages (of-record in parent application).
Notice of Allowance issued in U.S. Appl. No. 16/320,162, dated Feb. 25, 2022 in 18 pages (of-record in parent application).
First Examination Report issued in Australia Application No. AU2017304128, dated Apr. 29, 2021 in 4 pages (of-record in parent application).
Notice of Acceptance issued in Australia Application No. AU2017304128, dated Feb. 28, 2022 in 3 pages (of-record in parent application).
Second Examination Report issued in Australia Application No. AU2017304128, dated Oct. 1, 2021 in 4 pages (of-record in parent application).
Bellare et al., "A Forward-Secure Digital Signature Scheme", Proceedings of the Annual International Cryptology Conference Advances in Cryptology—Crypto 99, dated Dec. 16, 1999, pp. 431-448 (of-record in parent application).
Extended European Search Report issued in European Application No. EP17833662.4, dated Jan. 27, 2020 in 8 pages (of-record in parent application).
Office Action issued in European Application No. EP17833662.4, dated Dec. 23, 2021 in 4 pages (of-record in parent application).
Feng et al., "Continuous Remote Mobile Identity Management Using Biometric Integrated Touch-Display", 45th Annual IEEE/ACM International Symposium on Microarchitecture Workshops, dated Dec. 5, 2012, pp. 55-62 (of-record in parent application).
Håstad et al., "Funkspiel Schemes: An Alternative to Conventional Tamper Resistance", Proceedings of the 7th ACM Conference on Computer and Communications Security, dated Nov. 1, 2000, pp. 125-133 (of-record in parent application).
Iwata et al., "OMAC: One-Key CBC MAC", Department of Computer and Information Sciences Ibaraki University, vol. 2887, 2003, pp. 129-153 (of-record in parent application).
Iwata et al., "OMAC: One-Key CBC MAC", Lecture Notes in Computer Science, vol. 2887, 2003, pp. 129-153 (of-record in parent application).
Jueneman et al., "Message Authentication", Institute of Electrical and Electronics Engineers, Communications Magazine, vol. 23, No. 9, Sep. 1985, pp. 30-31 (of-record in parent application).
International Preliminary Report on Patentability issued in PCT Application No. PCT/IB2017/054441, dated Feb. 7, 2019 in 8 pages (of-record in parent application).
International Search Report and Written Opinion issued in PCT Application No. PCT/IB2017/054441, dated Dec. 4, 2017 in 10 pages (of-record in parent application).
Extended European Search Report dated Dec. 20, 2022 in EP Patent Application No. 22197259.9. 6 pages.
Examination Report No. 1 dated Mar. 6, 2023 in AU Patent Application No. 2022100184. 5 pages.
EMVCo; "EMV Integrated Circuit Card Specifications for Payment Systems, Book 4, Cardholder, Attendant, and Acquirer Interface Requirements, Version 4.3"; Nov. 2011; https://info.paxsz.com/DotBBSUploads/UploadFile/2011-12/20111261464449306.pdf; 154 total pages.
Examination Report No. 1 dated Mar. 21, 2023 in AU Patent Application No. 2022203908. 3 pages.

* cited by examiner

SYSTEM FOR AND METHOD OF AUTHENTICATING A COMPONENT OF AN ELECTRONIC DEVICE

CROSS-REFERENCE TO RELATED APPLICATION

This application is a Continuation of U.S. patent application Ser. No. 16/320,162, filed Jan. 24, 2019, which is the U.S. National Phase of PCT Application No. PCT/IB2017/054441, filed Jul. 21, 2017, which claims priority from U.S. Provisional Application No. 62/366,281, filed on Jul. 25, 2016, the entire content of which is incorporated herein by reference in jurisdictions allowing such incorporation.

FIELD

The present technology relates to systems and methods for authenticating a component of an electronic device. The system and method may be used, for example, in the context of private information entry on the electronic device to ensure that only authenticated components are able to process sensitive information.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present technology. Accordingly, it should be understood that these statements are to be read in this light, and not as admissions of prior art.

The expansion of the internet coupled with the multiplication of connected mobile electronic devices allows billions of people to use their mobile devices daily for learning, communicating, exchanging information and conducting financial transactions. While performing such activities, identity, personal information and sensitive data are often input into the device, stored on the device, and also sent through communication links and networks to service providers. However, as the value and volume of sensitive information processed by mobile devices and online service providers has increased, so too have the efforts of malevolent parties to obtain sensitive information and exploit it for financial gain or other illicit purposes. Given that servers and mobile devices are accessible through the internet, often malevolent parties operate remotely from the systems they aim to compromise, thus reducing risks to themselves. For example, they may perform cyber attacks on online systems and networking infrastructure, steal or otherwise compromise cryptographic keys, steal or guess passwords to individual's online and financial accounts, use email phishing and hijack their personal or financial accounts, perform unauthorized financial transactions, install malware on mobile devices or remote servers and networking equipment, etc. To mitigate these threats, mobile device makers and service providers typically implement various cyber-security measures to protect their online systems, coupled with basic authentication measures, such as using a personal identification code (PIC) or biometric ID to unlock a device and perform sensitive operations, as well as implementing anti-malware measures (both hardware and software) on the mobile device.

Cryptography plays a central and ubiquitous role to protect unwarranted or malevolent parties from accessing such sensitive information both on the mobile device and in online systems. Indeed many cryptographic methods have been developed to encrypt information, with the goal of making such private information inscrutable to unapproved parties and only accessible to authorized parties, who usually have in their possession a method or key only known to them to decrypt the encrypted information. In general, when cryptographic methods are properly implemented and operated according to approved standards, they are often effective in preventing attackers from using cryptanalysis, malware, or other methods to decipher encrypted information that they intercept through compromising a mobile device, networking equipment, online systems or other means, provided that the cryptographic keys remain secure.

While many malevolent parties operate remotely from the systems and devices that they aim to compromise, in some cases they may also have physical proximity, or even direct access and control of a device or server, which allows them to use physical methods of compromising a system that are not possible remotely.

Thus, some devices that perform encipherment of sensitive information do so in a hostile environment where the attacker may, to varying degrees, have access to the device interfaces or even be able to monitor or tamper with the internal components of the device, aiming to recover sensitive information prior to its encryption, or else to compromise cryptographic keys such that encipherment no longer protects sensitive information. This problem is particularly acute for terminals used in financial transactions, such as point-of-sale terminals or ATMs. For example, malicious entities as well as legitimate security researchers have devised or used sophisticated attacks to access private information processed by financial terminals, attacks that may involve using skimmers attached to electronic devices, replacing original and secure device components with counterfeit and insecure components, inserting information-disclosing bugs in the said devices, installing fake personal identification number (PIN) pads, and other methods to access the information in its unencrypted form. For this reason, standards applicable to the security of terminals, such as, but not limited to PCI-DSS and PCI-PTS, specify that terminals must put in place measures to detect and respond to physical tampering of the device, and so many such methods have been devised and implemented in commercial terminals.

It is also possible for malicious persons in possession of or even merely in proximity to an electronic device to non-invasively obtain sensitive information from the devices. Indeed, in a class of methods commonly referred to as side-channel attacks, a malevolent party tries to gain and exploit information arising from the physical implementation of the cryptographic system, such as by monitoring the power consumption, electromagnetic leaks or acoustic leaks of the electronic device. One form of side-channel attack, known as power analysis, refers to a method where the attacker studies the power consumption of a hardware device performing a cryptographic operation with the goal of non-invasively extracting cryptographic keys and other secret information from the device. As an example, simple power analysis (SPA) involves visual examination of a graph of the current drawn by a device over time for only a single cryptographic operation. Another, powerful, technique is differential power analysis (DPA), which uses statistical methods to extract secret keys from the observation of the power consumption for multiple cryptographic operations.

Considering the volume of financial information processed and exchanged daily via communication networks on mobile or other electronic devices and the potential for immediate financial gain for malevolent parties, tampering and hacking methods in the context of financial transactions effected on electronic devices that are deployed in a physically hostile environment, pose a threat to security. For the foregoing reasons, there is a need for methods and systems for authenticating a component of an electronic device.

SUMMARY

Embodiments of the present technology have been developed based on inventors' appreciation that known approaches for authenticating a component of an electronic device may, in some instances, not be relied upon to conduct secured PIC entries, specifically in the context of secured financial transactions. Improvements are therefore desirable, in particular improvements aimed at assuring that a component of the electronic device is an originally manufactured component and that the device, being deployed in a physically hostile environment, has not been tampered with by malevolent parties aiming to replace the original component with a malicious component and thereby compromise the security of the device.

The present technology arises from an observation made by the inventor(s) that while the usage of mobiles devices has been democratized, malevolent parties have devised sophisticated techniques to gain information from the physical implementation of a cryptosystem and that techniques that help ensure the physical integrity of the device when the device may be deployed in a hostile environment are an important aspect of securing information exchange and financial transactions.

Therefore, inventor(s) have devised method and systems for generating an unpredictable sequence of dynamic keys to be used for authentication of one component to another. The unpredictably is based on the use of a dynamic secret that is shared between the two components and updated in an unpredictable way, such as through the use of noise, at each transaction.

In accordance with a first broad aspect of the present technology, there is provided method for generating an encrypted and authenticated message by a first component of an electronic device, the message authenticating the first component as the originator of the message, the method comprising: encrypting a block of information based on a first encryption key acquired from a first memory of the first component associated with a second decryption key in a second component of the device so as to generate an encrypted block of information, accessing, from a first memory of the first component, a first previous version of a first dynamic unique key, the first previous version of the first dynamic unique key being at least partially based on a first original unique key,
generating a first current version of the dynamic unique key based on the first previous version of the first dynamic unique key, generating a message authentication code (MAC) based on the encrypted block of information and the first current version of the first dynamic unique key, and transmitting, to the second component the encrypted block of information and the MAC.

In some implementations of the method, the method further comprises receiving, at the second component, the message comprising the encrypted block of information and the message authentication code, accessing, from a second memory of the second component, a second previous version of a second dynamic unique key, the second previous version of the second dynamic unique key being at least partially based on a second original unique key, generating a second current version of the second dynamic unique key based on the second previous version of the dynamic unique key, generating, at the second component, a control MAC based on the received encrypted block of information and the second current version of the dynamic unique key, and upon determining that the control MAC matches the MAC, determining that the message is authentic and that therefore the first component originated the message.

In some implementations of the method, the method further comprises decrypting, by the second component, with a second decryption key acquired from a second memory of the second component, the second decryption key associated with the first encryption key, the encrypted block of information.

In some implementations of the method (1) the first previous version of the first dynamic unique key and the second previous version of the second dynamic unique key are identical, and (2) the first current version of the first dynamic unique key and the second current version of the second dynamic unique key are identical.

In some implementations of the method the first original key has been stored within the first memory of the first component at the time of manufacturing the first component, and wherein the second original key has been stored within the second memory of the second component at the time of manufacturing the second component.

In some implementations of the method, generating a first current version of the first dynamic unique key based on the first previous version of the dynamic unique key is further based on a first current version of the key serial number (KSN) and wherein generating the second current version of the second dynamic unique key based on the second previous version of the second dynamic unique key is further based on a second current version of the KSN.

In some implementations of the method, the transmitting, to the second component the encrypted block of information and the MAC further comprises transmitting the first current version of the KSN, the receiving further comprises receiving the second current version of the KSN, and wherein the second version of the KSN is the first current version of the KSN.

In some implementations of the method, the first encryption key is a public key, the second decryption key is a private key and wherein the block of information is encrypted and decrypted based on an asymmetric algorithm using the public key and the private key.

In some implementations of the method, the first encryption key is a secret key, the second decryption key is the secret key and wherein the block of information is encrypted and decrypted based on a symmetric algorithm using the secret key. In some implementations of the method, the method further comprises In some implementations of the method, the block of information is encrypted based on at least one of the ElGamal, elliptic curve techniques, paillier cryptosystem, Rivest Shadir Adleman (RSA), and Cramer-Shoup cryptosystem.

In some implementations of the method, the first key is a secret key, the second key is the secret key and the block of information is encrypted and decrypted based on at least one of Twofish, Serpent, Advanced Encryption Standard (AES), Data Encryption Standard (DES), Blowfish, CASTS, Grasshopper, Rivest Cipher 4 (RC4), Triple Data Encryption Algorithm (3DES), Skipjack, Safer +/++ and International Data Encryption Algorithm (IDEA) algorithm using the secret key.

In some implementations of the method, the MAC and the control MAC are generated according to a cipher block chaining message authentication code (CBC-MAC).

In some implementations of the method, the MAC and the control MAC are generated according to at least one of a keyed-hash message authentication code (HMAC), cipher-based message authentication code (CMAC), a one-key CBC-MAC (CMAC) and a parallelizable message authentication code (PMAC).

In some implementations of the method, the cipher block chaining message authentication code uses at least one of a DES algorithm, an AES algorithm, a RC6 algorithm, an IDEA algorithm and a 3DES algorithm.

In some implementations of the method, the block of information comprises one of a personal identification code (PIC) and a correspondence table of a scrambled keypad.

In some implementations of the method, the first component is one of a touch controller and an isolated secured area of a processor and the second component is a secure element.

In some implementations of the method, encrypting the block of information is further based on a current version of a noise acquired from the first component, the first current version of the KSN is based on a first previous version of the noise acquired from the first memory of the first component, wherein the accessing from the second memory of the second component further comprises accessing a second previous version of the noise and wherein the second current version of the KSN is based on the second previous version of the noise and wherein the method further comprises: storing, in the first memory of the first component, the first current version of the noise as the first previous version of the noise, and storing, in the second memory of the first component, the second current version of the noise as the second previous version of the noise.

In some implementations of the method, the first current version of the KSN is further based on a previous version of the KSN, the second current version of the KSN is further based on a second previous version of the KSN and wherein the method further comprises: storing, in the first memory of the first component, the first current version of the KSN as the first previous version of the KSN, and storing, in the second memory of the first component, the second current version of the KSN as the second previous version of the KSN.

In some implementations of the method, the key serial number is based on multiple previous versions of the noise.

In some implementations of the method, encrypting the block of information is further based on a nonce, and the method further comprises, after generating a second current version of the second dynamic unique key based on the second previous version of the dynamic unique key: accessing, from the second memory of the second component, a previous acknowledgment key, generating, at the second component, a current acknowledgment key based on the previous acknowledgment key and the noise, generating, at the second component, a current acknowledgment message based on the current acknowledgment key and the nonce, and transmitting, to the first component, the current acknowledgment message.

In some implementations of the method, the method further comprises receiving, at the first component, the current acknowledgment message, generating, at the first component, a control current acknowledgment key based on a second previous acknowledgment key and the noise, generating, at the first component, a control current acknowledgement message based on the nonce, and upon determining that the control current acknowledgement message matches the current acknowledgement message, determining that the second component correctly processed the encrypted block of information.

In accordance with another broad aspect of the present technology, there is provided a system for generating an encrypted and authenticated message for authenticating a first component of the system as the originator of the message, the system comprising: a processor, a non-transitory computer-readable medium comprising instructions, the first component comprising a first memory, the first component being operatively connected to the processor, a second component comprising a second memory, the second component being operatively connected to the processor and the first component, the processor, upon executing the instructions, being configured to cause: encrypting, at the first component, a block of information based on a first encryption key acquired from the first memory associated with a second decryption key in the second memory of the second component so as to generate an encrypted block of information, accessing, from the first memory, a first previous version of a first dynamic unique key, the first previous version of the first dynamic unique key being at least partially based on a first original unique key, generating, at the first component, a first current version of the dynamic unique key based on the first previous version of the first dynamic unique key, generating, at the first component, a message authentication code (MAC) based on the encrypted block of information and the first current version of the first dynamic unique key, and transmitting, by the first component to the second component, the encrypted block of information and the MAC.

In some implementations of the system, the processor is further configured to cause: receiving, at the second component, the message comprising the encrypted block of information and the message authentication code, accessing, from the second memory, a second previous version of a second dynamic unique key, the second previous version of the second dynamic unique key being at least partially based on a second original unique key, generating, at the second component, a second current version of the second dynamic unique key based on the second previous version of the dynamic unique key, generating, at the second component, a control MAC based on the received encrypted block of information and the second current version of the dynamic unique key, and
upon determining, at the second component, that the control MAC matches the MAC, determining that the message is authentic and that therefore the first component originated the message.

In some implementations of the system, the processor is further configured to cause: decrypting, by the second component, with a second decryption key acquired from the second memory, the second decryption key associated with the first encryption key, the encrypted block of information.

In some implementations of the system, (1) the first previous version of the first dynamic unique key and the second previous version of the second dynamic unique key are identical, and (2) the first current version of the first dynamic unique key and the second current version of the second dynamic unique key are identical.

In some implementations of the system, the first original key has been stored within the first memory of the first component at the time of manufacturing the first component, and wherein the second original key has been stored within the second memory of the second component at the time of manufacturing the second component.

In some implementations of the system, generating a first current version of the first dynamic unique key based on the first previous version of the dynamic unique key is further based on a first current version of the key serial number (KSN) and wherein generating the second current version of the second dynamic unique key based on the second previous version of the second dynamic unique key is further based on a second current version of the KSN.

In some implementations of the system, the transmitting, to the second component the encrypted block of information and the MAC further comprises transmitting the first current version of the KSN, the receiving further comprises receiving the second current version of the KSN, and wherein the second version of the KSN is the first current version of the KSN.

In some implementations of the system, the first encryption key is a public key, the second decryption key is a private key and wherein the block of information is encrypted and decrypted based on an asymmetric algorithm using the public key and the private key.

In some implementations of the system, the first encryption key is a secret key, the second decryption key is the secret key and wherein the block of information is encrypted and decrypted based on a symmetric algorithm using the secret key.

In some implementations of the system, the block of information is encrypted based on at least one of the ElGamal, elliptic curve techniques, paillier cryptosystem, Rivest Shadir Adleman (RSA), and Cramer-Shoup cryptosystem.

In some implementations of the system, the first key is a secret key, the second key is the secret key and the block of information is encrypted and decrypted based on at least one of Twofish, Serpent, Advanced Encryption Standard (AES), Data Encryption Standard (DES), Blowfish, CASTS, Grasshopper, Rivest Cipher 4 (RC4), Triple Data Encryption Algorithm (3DES), Skipjack, Safer +/++ and IDEA algorithm using the secret key.

In some implementations of the system, the MAC and the control MAC are generated according to a cipher block chaining message authentication code (CBC-MAC).

In some implementations of the system, the MAC and the control MAC are generated according to at least one of a keyed-hash message authentication code (HMAC), cipher-based message authentication code (CMAC), a one-key CBC-MAC (CMAC) and a parallelizable message authentication code (PMAC).

In some implementations of the system, the cipher block chaining message authentication code uses at least one of a DES algorithm, an AES algorithm, a RC6 algorithm, an IDEA algorithm and a 3DES algorithm.

In some implementations of the system, the block of information comprises one of a personal identification code (PIC) and a correspondence table of a scrambled keypad.

In some implementations of the system, the first component is one of a touch controller and an isolated secured area of a processor and the second component is a secure element.

In some implementations of the system, encrypting the block of information is further based on a current version of a noise acquired from the first component, the first current version of the KSN is based on a first previous version of the noise acquired from the first memory of the first component, wherein the accessing from the second memory of the second component further comprises accessing a second previous version of the noise and wherein the second current version of the KSN is based on the second previous version of the noise and wherein the processor is further configured to cause: storing, in the first memory of the first component, the first current version of the noise as the first previous version of the noise, and storing, in the second memory of the first component, the second current version of the noise as the second previous version of the noise.

In some implementations of the system, system of any of claims 22 to 38, where in the first current version of the KSN is further based on a previous version of the KSN, the second current version of the KSN is further based on a second previous version of the KSN and wherein the processor is further configured to cause: storing, in the first memory of the first component, the first current version of the KSN as the first previous version of the KSN, and storing, in the second memory of the first component, the second current version of the KSN as the second previous version of the KSN.

In some implementations of the system, the key serial number is based on multiple previous versions of the noise.

In some implementations of the system, encrypting the block of information is further based on a nonce, and wherein the processor is further configured to cause, after generating a second current version of the second dynamic unique key based on the second previous version of the dynamic unique key: accessing, from the second memory of the second component, a previous acknowledgment key, generating, at the second component, a current acknowledgment key based on the previous acknowledgment key and the noise, generating, at the second component, a current acknowledgment message based on the current acknowledgment key and the nonce, and transmitting, to the first component, the current acknowledgment message.

In some implementations of the system, the processor is further configured to cause: receiving, at the first component, the current acknowledgment message, generating, at the first component, a control current acknowledgment key based on a second previous acknowledgment key and the noise, generating, at the first component, a control current acknowledgement message based on the nonce, and upon determining that the control current acknowledgement message matches the current acknowledgement message, determining that the second component correctly processed the encrypted block of information.

BRIEF DESCRIPTION OF THE DRAWINGS

These and other features, aspects and advantages of the present technology will become better understood with regard to the following description, appended claims and accompanying drawings where:

DETAILED DESCRIPTION OF THE DRAWINGS

Figure 1:
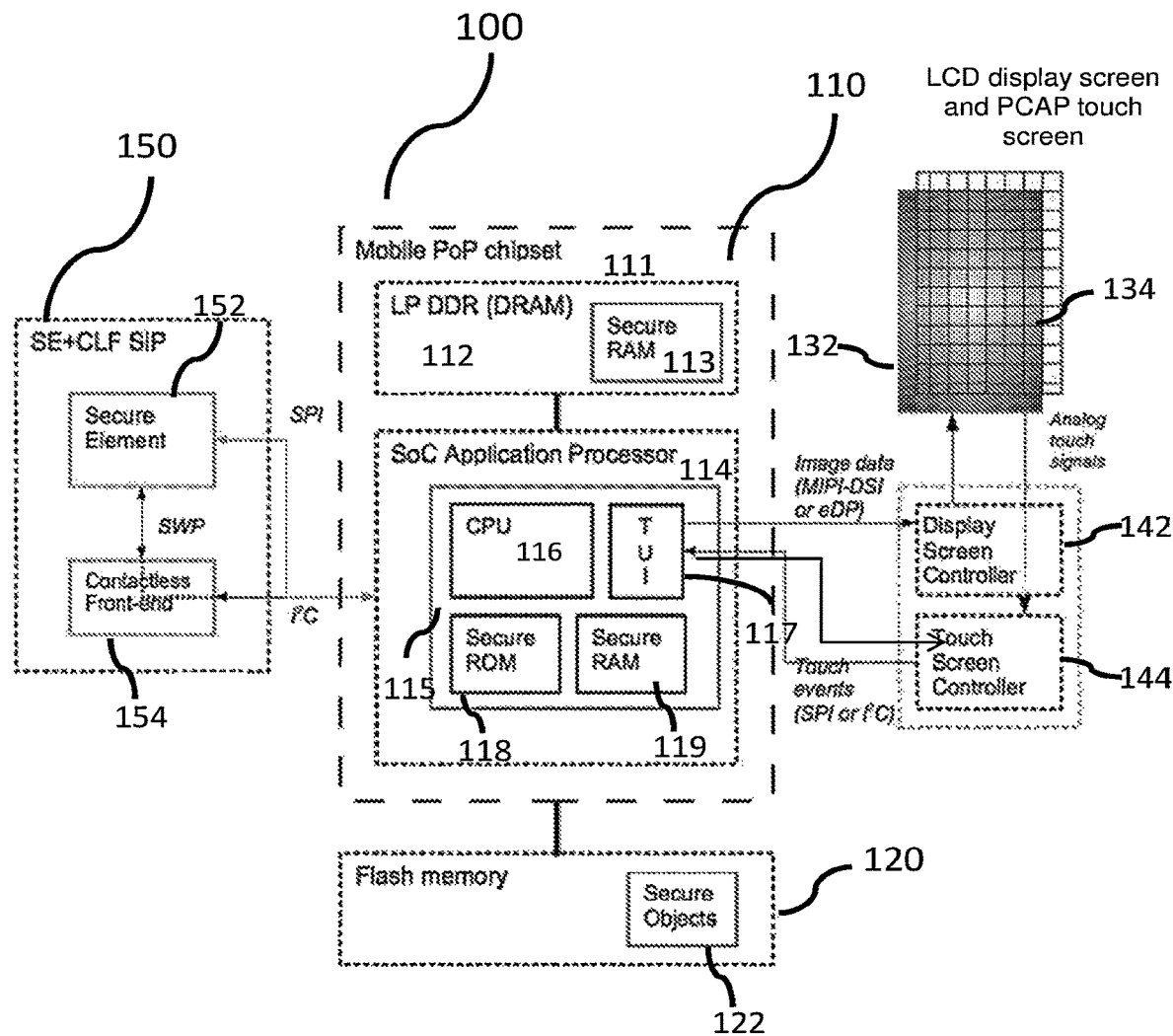
FIG. 1 is an illustration of components and features of an electronic device in accordance with an embodiment of the present technology.

Various exemplary embodiments of the described technology will be described more fully hereinafter with reference to the accompanying drawings, in which exemplary embodiments are shown. The present inventive concept may, however, be embodied in many different forms and should not be construed as limited to the exemplary embodiments set forth herein. Rather, these exemplary embodiments are provided so that the disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular exemplary embodiments and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the context of the present technology, "data", "block of information", "plaintext", "cleartext" may refer to information that is used as an input to an encryption algorithm to output a ciphertext or encrypted information.

In the context of the present technology, "encryption" may refer to the process of encoding information so as to only allow one or more authorized parties to read it while precluding unauthorized parties to read it. An authorized party may be an authorized user, an authorized device or an authorized component. Generally, an encryption algorithm receives a plaintext as an input and outputs a ciphertext which can only be read when decrypted. In some embodiments, an encryption algorithm may receive an already encrypted data to input as plaintext.

In the context of the present technology, a "cipher" may refer to algorithm for performing encryption and/or decryption. In some embodiments, stream ciphers may encrypt the bits of information one at a time. In some embodiments, block ciphers may take a number of bits ("block") and encrypt them as a single unit, and may also pad the plaintext so it is a multiple of the block size.

In the context of the present technology, "authentication" may refer to the act of confirming the origin of a component of a device and of the data that it transmits. Such a component may have been installed by the original equipment manufacturer (OEM). Authenticating a component allows other components of the device to confirm the authenticated component as genuine and trusted, thus establishing a secure connection and preventing non-genuine and untrusted components from receiving, transmitting, storing or processing sensitive information. Authentication may be performed using digital certificates, passwords, messages, cryptographic keys and algorithms or other inherent factors.

In the context of the present technology, a "key" may refer to a piece of information or a variable value determining the functional output of a cryptographic algorithm. In the context of encryption, a key may, at least partially, specify the transformation of plain text into ciphertext.

In the context of the present technology, "public-key cryptography", "public key algorithms" or "asymmetric cryptography" may refer to a cryptographic system using a pair of keys; public keys paired with private keys, for authentication, encryption and decryption. A public key may be distributed freely and published. A private key may be kept secret. Generally, data may be encrypted and/or authenticated using the public key and may only be decrypted and/or signed using the corresponding private key. Data may also be encrypted using the private key and decrypted using the public key. Examples of asymmetric key algorithms include DSS, ElGamal, elliptic curve techniques, password-authenticated key agreement techniques, paillier cryptosystem, Rivest Shadir Adleman (RSA), Cramer-Shoup cryptosystem and YAK.

In the context of the present technology, "secret key cryptography," "symmetric cryptography", and "symmetric-key algorithms" may refer to a cryptographic system using the same keys for encryption and decryption. The keys may be identical or there may be a simple transformation to obtain one key from the other. The secret keys may be a shared secret between at least two parties to maintain a secure information link. Generally, symmetric-key cryptography may use stream ciphers or block ciphers. Examples of symmetric keys algorithms include Twofish, Serpent, Advanced Encryption Standard (AES), Data Encryption Standard (DES), Blowfish, CAST5, Grasshopper, Rivest Cipher 4 (RC4), Triple Data Encryption Algorithm (3DES), Skipjack, Safer +/++ and International Data Encryption Algorithm (IDEA).

In the context of the present technology, a "cryptographic hash function" or "cryptographic hash algorithm" may refer to an algorithm mapping input data of arbitrary size to an output bit string of fixed size, the hash. The algorithm is designed to be a one-way function, which is a function infeasible to invert, and also so that different input data are very unlikely to produce the same hash. Examples of cryptographic hash functions include SHA, MD, Subhash, WHIRPOOL, RADIOGATÚN.

In the context of the present technology, a "message authentication code" (MAC) may refer to a piece of information used to authenticate a message. A MAC may protect a message's data integrity and authenticity by allowing verifying parties to detect both counterfeit messages and alterations of the content of authentic messages. Generally, a system to generate and verify MACs may include three algorithms: a key generation algorithm selecting a key from a key space, a keyed hashing algorithm returning a MAC given a message and the key, and a verifying algorithm to verify the authenticity of a message given the key and the MAC. A keyed hashing algorithm may be based on a cryptographic hash function (hash-based MAC) or on an encipherment algorithm (cipher-based MAC). Examples of hashed-based MAC algorithms include secret prefix MAC, secret suffix MAC and keyed-hash MAC (HMAC). Examples of cipher-based MAC algorithms include cipher block chaining MAC (CBC-MAC), cipher-based MAC (CMAC), One-key CBC-MAC (OMAC), and parallelizable MAC (PMAC).

In the context of the present technology a "hardware random number generator" or "true random number generator" (TRNG) may refer to a device that generates random numbers from physical processes.

In the context of the present technology, a "pseudorandom number generator" (PRNG) or "deterministic random bit generator" (DRBG) may refer to software methods for generating a sequence of numbers while approximating the properties of sequences of random numbers.

Throughout the present disclosure, reference is made to secure transactions (for example, but without being limitative, contact and contactless transactions), secure elements (for example, but without being limitative, chipset, secured chipset, hardware embedding secured component, software embedding secured component, or firmware embedding secured component) and security standards. Examples of security standards include, without being limitative, certification standards from Europay, MasterCard, and Visa (EMV), EMVCo, MasterCard®, Visa®, American Express®, JCB®, Discover® and from the PCI SSC (Payment Card Industry Security Standards Council), founded by MasterCard®, Visa®, American Express®, Discover® and JCB® and dealing specifically with the definition of security standards for financial transactions. Reference to secure transactions, secure elements, and security standards is made for the purpose of illustration and is intended to be exemplary of the present technology and not limiting of the scope thereof.

In the context of the present technology, a "processor" may refer to a system on chip (SoC), an integrated circuit that integrates components of a computing system in a single chip. A typical SoC may include but is not limited to one or more general-purpose microprocessors or Central Processing Units (CPUs), co-processors such as a digital signal processor (DSP), a Graphics Processing Unit (GPU), and multimedia coprocessors such as MPEG and JPEG encoders and decoders. The SoC may also include modems for various wireless communications interfaces including cellular (e.g. LTE/4G, 3G, GSM, CDMA, etc.), Bluetooth, and Wireless Fidelity (Wi-Fi) (IEEE 802.11). The SoC may include memory controllers for interfacing with on-die or external DRAM memory chips, and on-die memory blocks including a selection of ROM, SRAM, DRAM, EEPROM and flash memory. The SoC may additionally include timing sources, peripherals including counter-timers, real-time timers and power-on reset generators, debug, JTAG and Design For Test (DFT) interfaces, external interfaces, analog interfaces, voltage regulators, power management circuits, etc. The SoC may also include connectivity components such as simple buses or on-chip networks following the ARM® Advanced Microcontroller Bus Architecture (AMBA®) specification connecting these blocks together as known in the art. Some blocks, such as additional integrated circuits, typically memory (flash or RAM), may be packaged separately and stacked on the top of the SoC, a design known in the art as Package-on-package (PoP). Alternatively some blocks, such as additional integrated circuits, may be comprised in distinct integrated circuits (or dies) but packaged together, a design known in the art as a System in Package (SiP).

In the context of the present technology, an "isolated secured area of the processor (ISA)" may refer to a processing entity characterized by specific hardware and/or software components subject to a certification ensuring a specific level of security according to specific security standards. The isolated secured area ensures that sensitive data is stored, processed and protected in a secured and trusted environment of the processor while typically maintaining high processing speeds and large amounts of accessible memory. The isolated secured area may offer isolated execution, secure storage, remote attestation, secure provisioning, trusted boot and trusted path. The isolated secured area allows the processor to operate in two modes: normal world or secure world. The normal world is run by the non-secure area of the processor and may comprise the non-secure Rich Operating System (Rich OS) and the software components and applications that run on top of the Rich OS. The normal world is excluded from accessing resources that are provisioned for exclusive use in the secure world. The secure world is run by the isolated secured area and may comprise the Secure Operating System (Secure OS) and the software components and trusted applications that run on top of the Secure OS. The isolated secure area is the only entity to have access to resources provisioned for use exclusively in the secured area, such as certain delineated ranges of ROM or RAM memory, processor or co-processor configuration registers, and certain peripherals such as display controllers or touch screen controllers, and their associated configuration registers. Some of the resources provisioned for the exclusive use of the isolated secure area may be on the same die or package as the SoC, while others may be contained in a different die or package. Some of the resources may be dynamically provisioned for the exclusive use of the isolated secure area at certain times, while at other times they may be available for use by the normal world. The isolated secured area only runs authorized and trusted applications and provides security against logical attacks generated in the Rich OS environment, attacks aiming to compromise boot firmware, attacks that exploit debug and test interfaces, and other non-invasive attacks. Non-limiting examples of an isolated secured area of the processor include Trusted Execution Environment (TEE), Qualcomm Secure Execution Environment (QSEE), Intel Trusted Execution Technology (TXT), the Trusted Platform Module (TPM), the Hengzhi chip and the IBM Embedded Security Subsystem (ESS) chip. In some embodiments, the isolated secured area of the processor is designed so as to not be accessed, even by a human administrator. In other embodiments, the secure element may be a secure enclave coprocessor, such as the secure enclave present in ARMv8-based processors designed by ARM Holdings and Apple Inc. In some embodiments, the isolated secured area may be implemented partially or completely via a dedicated hardware element such as, but without being limited thereto, a secure element as defined in the paragraph below. Other variations of the isolated secured area may also be envisioned by the person skilled in the art of the present technology without departing from the scope of the present technology.

In the context of the present technology, a "secure element" may refer to a processing entity characterized by specific hardware and/or software components subject to a certification ensuring a specific level of security according to specific security standards. From a hardware perspective, a secure element includes the usual components found in a computing entity: at least one microprocessor (e.g. CPU), memory (e.g. ROM, RAM or FLASH memory), communication interfaces, etc. Specific hardware components may also be included to implement specific functionalities particular to a secure element. For instance, a cryptographic accelerator may be included. Also, various tamper resistance, tamper detection and/or tamper response features may be included to prevent a malicious person from extracting sensitive information from the secure element. Anti-tamper measures may comprise hardware aspects, software aspects, or a combination of hardware and software. Also, certain counter-measures to prevent side-channel attacks aiming to recover cryptographic keys or other sensitive information may be included in the secure element. Counter-measures against side-channel attacks may include hardware aspects, software aspects, or both. Also, measures to reduce EM emissions, such as shielding, may be included, to protect the secure element from eavesdropping. In the context of financial transactions, the certification of the secure element ensures that various financial entities are willing to use the secure element to store and process critical financial data and associated cryptographic keys, and to perform secured financial transactions using the critical financial data and keys. In some embodiments, the secure element may be solely characterized by software components. The secure element may be, in some embodiments, implemented partially or completely as an isolated secured area of the processor, such as the isolated secured as described in the paragraph above, in which case, the secure element may be implemented, for example, but without being limitative, as a TEE, a TPM and/or an ESS. In other embodiments, the secure element may be a secure enclave coprocessor, such as the secure enclave present in ARMv8 based processors designed by ARM Holdings and Apple Inc. Other variations of the secure element may also be envisioned by the person skilled in the art of the present technology without departing from the scope of the present technology.

In the context of the present technology, a "touch screen" may refer to a touch-sensitive sensor device with an input and/or output interface usually superimposed on top of or integrated with an electronic visual display of an information processing system, the integrated combination of both the touch screen and the visual display being referred to as a "touch display". Touch screens usually work by detecting tactile and/or haptic contact with the touch screen. Touch screen technologies may include, but are not limited to resistive, surface acoustic wave, capacitive, projective capacitive, infrared grid, infrared acrylic projection, optical imaging, dispersive signal technology and acoustic pulse recognition touchscreens. Touch screens may include force sensitive components to detect pressure applied to the screen. Touch screens may also include haptic feedback components. Other variations of the touch screen may also be envisioned by the person skilled in the art of the present technology without departing from the scope of the present technology.

In the context of the present technology, a "touch screen controller" may refer to a controller that detects analog touch signals output by the touch screen, may perform analog-to-digital conversion of the analog output, may perform signal processing steps to condition the signal and deduce the screen coordinates associated with one or more touch events. Typically, but non-limitatively, the coordinates of touch events will be output to a processor using a low-bandwidth serial interface including serial peripheral interface (SPI) and inter-integrated circuit (VC) interfaces, as it is known in the art. The touch screen controller may be integrated with the display controller or any other block. Other variations of the touch screen controller may also be envisioned by the person skilled in the art of the present technology without departing from the scope of the present technology.

In the context of the present technology, a "display screen" may refer to an electronic visual display device with an input and/or output interface used to convey visual information the user. Display screen technologies may include, but are not limited to, Liquid Crystal Displays (LCD), displays screens based on Organic Light-Emitting Diode (OLED) technology, displays screens based on active-matrix organic light-emitting diode (AMOLED) technology.

In the context of the present technology, a "display screen controller" may refer to a device capable of inputting digital image data, either from a frame buffer in memory or from a standard digital interface such as MIPI or eDP, and outputting analog or digital video signals suitable for interfacing with the specific display screen technology and at an appropriate frame rate (for example, using LVDS). The display screen controller may be included in the same die or package as the processor SoC, or be a discrete component, or be integrated with the display screen, or a combination. The display screen controller may include functions for image upscaling, downscaling, rotation and blending.

In the context of the present technology, a "trusted user interface (TUI)" may refer to a combination of software, hardware and peripheral resources which may be reserved for the exclusive use of the isolated secure area and may be configured in such a way as to give exclusive and non-interruptible control of the display screen (or a portion thereof) and the touch screen to the isolated secure area and to maintain the integrity and confidentiality of the displayed images and of the touch events generated by the touch screen and controller. The TUI in a device may be subjected to a certification ensuring a specific level of security according to specific security standards. A TUI automatically detects and only allows authorized or trusted applications to access the content of a secure screen memory. In one embodiment, the TUI is one specific mode in which the device is controlled by the isolated secured area of the processor to ensure that the information displayed on the touch screen is from a trusted source and isolated from the operating system. Other variations of the TUI may also be envisioned by the person skilled in the art of the present technology without departing from the scope of the present technology.

Even though the various components defined above are each associated with a definition, it should be understood that each one of the various components should not be construed as being solely limited to the specific functions and/or specifics provided in the associated definition. To the contrary, other functions and/or specifics may be added, removed or combined without departing from the scope of the present technology. In addition, functions and/or specifics may be switched from one component to another component without departing from the scope of the present technology (e.g., a function associated with the touch screen controller may be switched to the touch screen). Some of the various components may also be partially or completely merged together without departing from the scope of the present technology (e.g., the display controller and the processor may be merged together to define a single component).

FIG. 1 is a block diagram illustrating various exemplary components and features of an illustrative device 100 in accordance with one embodiment of the present technology.

In accordance with at least one embodiment described herein, a method and a system for authenticating a component of an electronic device are provided. The electronic device 100 (which may equally be referred to as "a device" or "the device") comprises a SoC application processor 114 and the SoC processor 114 comprises an isolated secured area 115. The device also comprises a LCD display screen 132 operatively connected to a display screen controller 142, the display screen controller 142 operatively connected to the SoC application processor 114, a projective capacitive (PCAP) touch screen 134 operatively connected to a touch screen controller 144, the touch screen controller 144 operatively connected to the SoC application processor 114 and a secure element 152 associated with the SoC application processor 114.

In some embodiments, the electronic device 100 may be implemented as any device comprising the components needed to carry a method and a system detailed hereinafter. In some embodiments, the electronic device 100 may be a smartphone, a smartwatch and/or a wearable computer, a PDA, a tablet and a computer. In some alternative embodiments, the device may also be embedded in or on objects not solely dedicated to computing and/or information processing functions, such as, but no limited to, a vehicle, a piece of furniture, an appliance, etc.

In the illustrated embodiment, the electronic device 100 comprises a mobile package on package (PoP) chipset 110, the PCAP touch screen 134 superimposed on the LCD display screen 132, the display screen controller 142 and the touch screen controller 144, the secure element 152, a contactless front-end (also know as a Near Field Communication (NFC) controller) 154 and a flash memory 120.

In a non-limiting embodiment, the mobile PoP chipset 110 comprises a Low Power Double Data Rate (LP DDR) memory 112 stacked with the SoC application processor 114. The SoC application processor 114 comprises an isolated secured area (ISA) 115, a central processing unit (CPU) 116, a trusted user interface (TUI) 117, a secure read-only memory (ROM) 118 and a secure random access memory (RAM) 119. The LP DDR memory 112 comprises a secure DRAM memory 113. The mobile PoP chipset 110 is connected to the flash memory 120, the flash memory 120 comprising secure objects 122.

In some embodiments of the present technology, the electronic device 100 may execute a non-secure operating system (OS), such as the Rich OS. Examples of a Rich running on the SoC application processor 114 include, but are not limited to, a version of iOS®, or a derivative thereof, available from Apple Inc.; a version of Android OS®, or a derivative thereof, available from Google Inc.; a version of PlayBook OS®, or a derivative thereof, available from BlackBerry Inc. It is understood that other proprietary OSs or custom made OSs may be equally used without departing from the scope of the present technology.

In some embodiments of the present technology, the isolated secure area may execute a Secure OS, which is separate, distinct and isolated from the OS being executed by the non-secure area of the processor. The secure OS typically has higher privilege levels than the non-secure OS, which allow it, for example, to exclude the non-secure OS from accessing sensitive resources. The secure OS may be entirely different from the non-secure OS (e.g. a secure microkernel), or may be substantially the same as the non-secure OS (e.g. a modified version of Linux®).

The touch screen controller 144 is connected to the TUI 117 by way of a serial peripheral interface (SPI) or inter-integrated circuit (PC) interface, serial interfaces known in the art for attaching integrated circuits (ICs) such as processors and microcontrollers. The display screen controller 142 is connected to the TUI 117 with a mobile industry processor interface display serial interface (MIPI-DSI) or an embedded display port (eDP) connection, communication protocols and serial buses between host and device, as would be recognized by someone skilled in the art. The PCAP touch screen 134 is superimposed on the LCD display 132. The secure element 152 may be directly connected to the SoC application processor 114 by way of a SPI bus interface or indirectly connected to the SoC application processor 114 via the contactless front end 154. The secure element 152 is also connected to the contactless front end 140 by way of a Single Wire Protocol (SWP) interface. The contactless front end 140 is connected to the SoC application processor 114 with an PC interface. In some embodiments, the touch screen controller 144 may be securely connected to the TUI 117, such that transmission of data between touch screen controller 144 and TUI 117 is partially or fully encrypted. In some embodiments, the secure element 152 is securely connected to the contactless front-end 154 and to the SoC application processor 114, such that transmission of data between the secure element 152, the contactless front-end 152 and the SoC application processor 114 is partially or fully encrypted. Such examples of devices and connections are only presented for an illustrative purpose, and other variations may be possible, as would be recognized by a person skilled in the art of the present technology.

Figure 2:
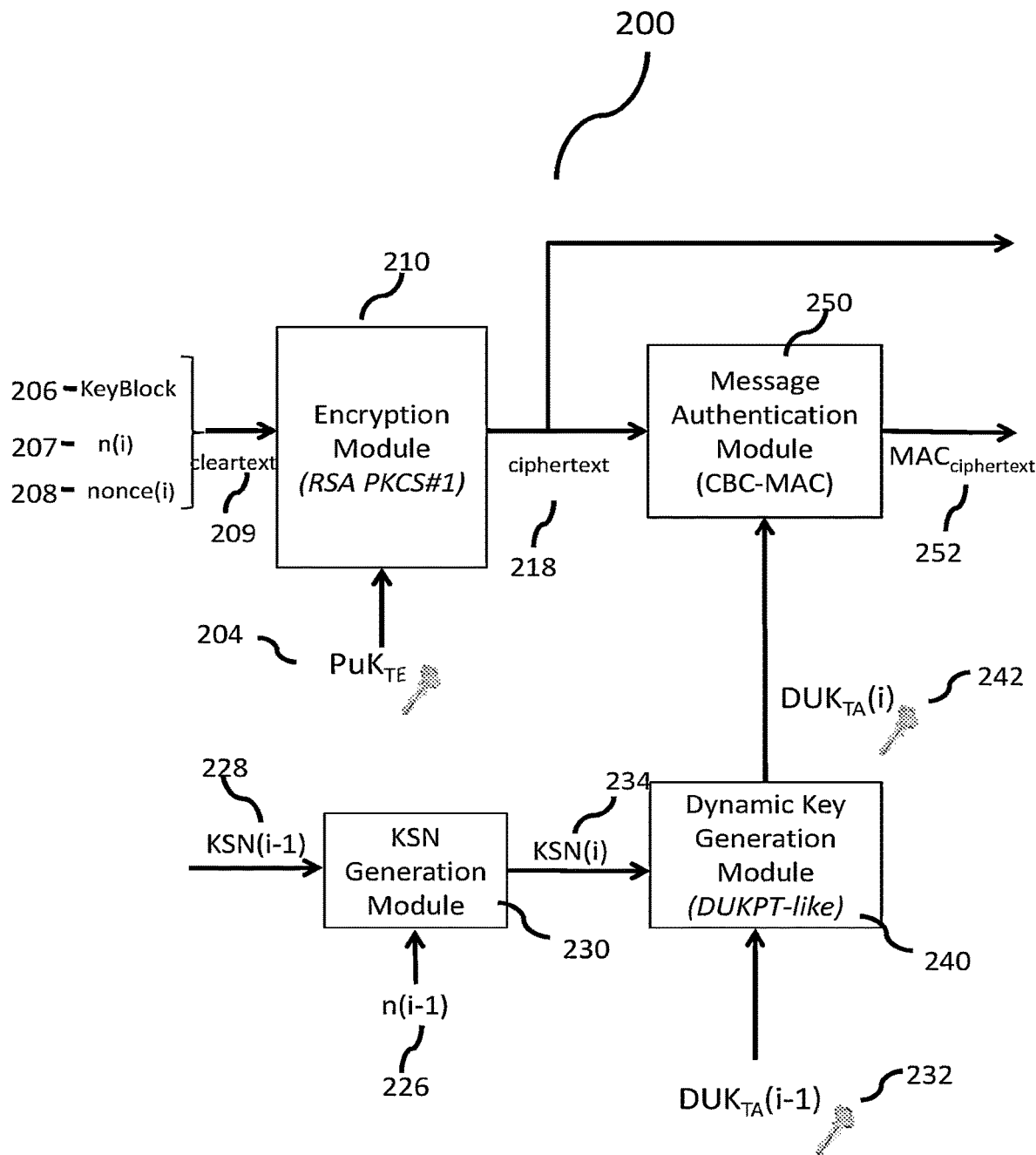
FIG. 2 is an illustration of a secure architecture system in accordance with an embodiment of the present technology.

Reference is now made to FIG. 2, which depicts a secure architecture system 200 in accordance with some embodiments of the current technology.

Generally, the secure architecture system 200 may comprise an encryption module 210, a key serial number (KSN) generation module 230, a dynamic key generation module 240 and a message authentication module 250. Each one of the modules 210, 230, 240 and 250 may be executed in part or entirely by the touch screen controller 144 and/or by the secure element 152 and/or the ISA 115. As described in the example herein, the secure architecture system 200 with the encryption module 210, the KSN generation module 230, the dynamic key management module 240 and the message authentication module 250 are executed by the touch screen controller 144. In some embodiments, the secure architecture system 200 may be executed by secure software executing on the secure element 152. In other embodiments, the secure architecture system 200 may be executed by secure software executing on the ISA 115.

Generally, the encryption module 210 may be used for encrypting a plaintext message containing sensitive information, such as a PIC or a password, to output an enciphered message. In some embodiments, the method described herein may be, but not necessarily, used with the method described in U.S. Provisional Patent Application No. 62/271,428 titled SYSTEM FOR AND METHOD OF AUTHENTICATING A USER ON A DEVICE, which is hereby incorporated by reference. The touch screen controller 144 may receive or acquire a PIN in the form of a KeyBlock 206 whose value may be for example [9,8,7,6]. In some embodiments, to increase the unpredictability of the method, the touch screen controller 144 may further receive or acquire a current version of the noise 207, wherein the current version of the noise 207 may be collected from the environment of the touch screen controller 144, such as from the randomness of touch event coordinates and/or the timing of the touch events. In other embodiments, the current version of the noise 207 may be generated by a TRNG (not depicted) on the electronic device 100. In some embodiments, the current version of the noise 207 may be a combination of multiple random noises (not depicted) collected from multiple components of the electronic device 100. The touch screen controller 144 may further generate, receive or acquire a number used only once (nonce) 208, which may be generated by a PRNG (not depicted) on the electronic device 100. The KeyBlock 206, the current version of the noise 207 and the nonce 208 may be concatenated together to form a cleartext 209 as an input to an RSA encryption algorithm in the encryption module 210. In some embodiments, the cleartext 209 may only be the KeyBlock 206. In other embodiments, the clear text 209 may only be the KeyBlock 206 concatenated with the current version of the noise 207. The touch screen controller 144 may receive or acquire from its memory a public key 204, with a key size typically between 1024 to 4096 bits. In some embodiments, the encryption module 210 may implement RSA encryption using a public key 204 and following the PKCS #1 standard. The public key 204 may be used as another input in the RSA encryption algorithm of the encryption module 210. The encryption module 210 may then use the cleartext 209 and the public key 204 in the RSA encryption algorithm to output a ciphertext 218. In some embodiments, another public-key encryption algorithm may be used, such as, but not limited to elliptic-curve cryptography, DiCramer-Shoup cryptosystem, or any other secure algorithm, as it would be recognized by a person skilled in the art of the present technology. In other embodiments, a symmetric-key cryptography algorithm might be used that uses a secret key, such as, but not limited to, AES, Triple DES, Blowfish, Serpent, Twofish or any other secure algorithm, as it would be recognized by a person skilled in the art of present technology.

A key serial number (KSN) generation module 230 may also be present. The key serial number generation module 230 may be used to generate the first current version of the KSN 234. The first current version of the KSN 234 may be between 8 and 10 bytes long. In some embodiments, the first current version of the KSN 234 may be of a different size. The first current version of the KSN 234 may be based on a previous version of the noise 226, the previous version of the noise 226 acquired from the memory of the touch screen controller 144, the previous version of the noise 226 being from a previous transaction. In some embodiments, the first current version of the KSN 234 may be further based on a previous version of the KSN 228 acquired from the memory of the touch screen controller 144, the previous version of the KSN 228 being from a previous transaction. In other embodiments, the first current version of the KSN 234 for every transaction may be the result of a function that mixes the previous version of the noise 226 and the previous version of the KSN 228 through a number of logical or arithmetic operations such as shifting, XORing, addition, etc. As a non-limitative example of the mixing function, the previous version of the KSN 228 may be circularly shifted by some number of bits and go through an exclusive or (XOR) operation with the previous version of the noise 226. In some embodiments, the first current version of the KSN 234 may not only be based on the previous version of the noise 226, but on multiple previous versions of the noise (not depicted) where a temporary KSN (not depicted) may be defined as the previous version of the KSN 228, and the mixing operation may be repeated several times on the temporary KSN, whereby the temporary KSN may be shifted by some number of bits and go through a XOR operation with a different previous version of the noise each time, for k times. The first current version of the KSN 234 may then be defined as the result of this operation. The KSN generation module 230 may further store the first current version of the KSN 234 as the previous version of the KSN 228 in its memory.

The dynamic key generation module 240 may be used for generating cryptographic keys so as to secure the secure architecture system 200 and use a different key for each session or transaction to prevent or mitigate statistically-based side-channel attacks such as DPA. In the example depicted herein, the dynamic key generation module 240 may be used to generate a different secret key for every transaction, as an input to the message authentication module 250. The dynamic key generation module 240 may employ a method to derive unique keys per transaction that is based on, adapted from, similar, or identical to that described in ANSI X.29-1, also known as the (DUKPT) method. Here, touch screen controller 144 may receive or acquire from its memory the first current version of the KSN 234. The first current version of the KSN 234 may be used as an input to the dynamic key generation module 240. The touch screen controller 144 may acquire, from its memory (not depicted), a first previous version of the dynamic unique key 232, the previous version of the dynamic unique key 232 having been used in a previous transaction by the secure architecture system 200. The previous version of the dynamic unique key 232 may be based on an original unique key (not depicted). The first previous version of the dynamic unique key 232 may be used as an input into the dynamic key generation module 240. The dynamic key management module 240 may then generate a first current version of the dynamic unique key 242 based on the previous version of the dynamic unique key 232 and the first current version of the KSN 234, using a DUKPT-like method. For example, the dynamic key generation module 240 may simply use the previous version of the dynamic unique key 232 to encrypt, using an algorithm such as DES or AES, the first current version of the KSN 234, in order to obtain the first current version of the dynamic key 242. In some embodiments, the dynamic key generation module 240 may be based on other methods used to generate dynamic keys.

The message authentication module 250 may be used to generate a message authentication code 252, the message authentication code (MAC) 252 for authenticating the message or ciphertext 218 together with the touch screen controller 144 as the originator of the message. The MAC 252 may protect the encrypted block of information's 220 data integrity and demonstrate its authenticity. The current version of the dynamic unique key 242, generated by the key generation module 240 may be used, together with the ciphertext 218, generated by the encryption module 210, as an input to the message authentication module 250. The message authentication module 250 may then use the current version of the dynamic unique key 242 and the ciphertext 218 as inputs to the cipher block chaining message authentication code (CBC-MAC) method to generate the MAC 252. The message authentication module 250 may use an AES, 3DES or any other secure standard block cipher algorithm as the core cipher block of CBC-MAC. Alternatively, the message authentication module 250 may use any hash-based MAC generation method, whereby a cryptographic hash function together with the current version of the dynamic unique key 242 is used to generate the MAC, for example the secret prefix MAC technique, or the secret suffix MAC technique, or the keyed-hash message authentication code (HMAC) technique. The message authentication module 250, if using a hash-based MAC generation method, may use as the core hash function a cryptographic hash algorithm, such as a SHA-2 or SHA-3 algorithm. An example of a hash-based MAC generation method is the secret suffix method using a SHA3-256 function taking as an input a concatenation of the ciphertext 218 and the current version of the dynamic unique key 242 and producing a 256-bit MAC. In some embodiments, the message authentication module 250 may use other methods or algorithms, such as, but not limited to, data authentication algorithm (DAA), cipher-based message authentication code (CMAC), a one-key CBC-MAC (CMAC), parallelizable message authentication code (PMAC), universal hashing based MAC (UMAC/VMAC) and Poly1305.

Figure 3:
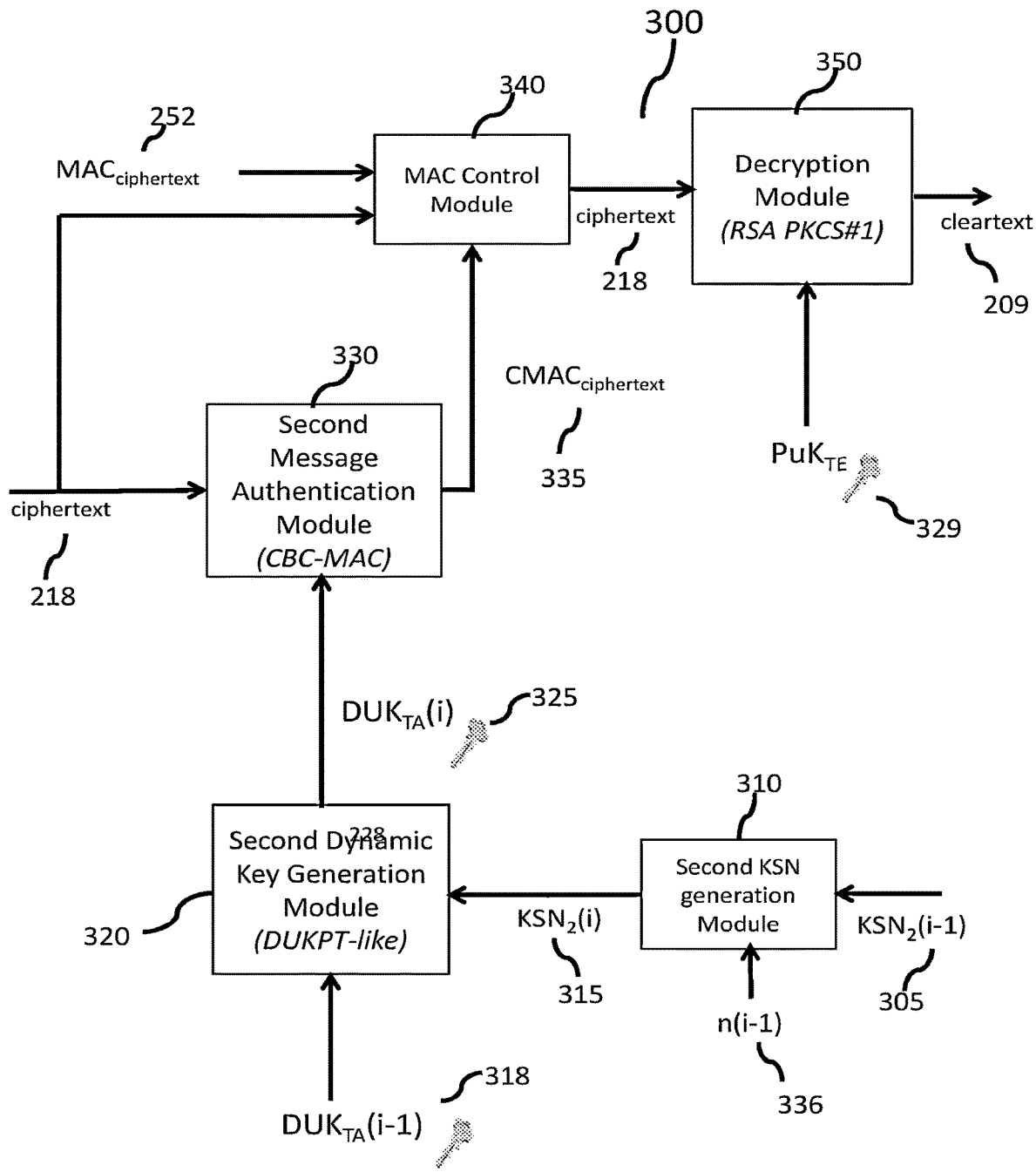
FIG. 3 is an illustration of a secure architecture system for authentication in accordance with an embodiment of the present technology.

Reference is now made to FIG. 3, which depicts a secure architecture system 300 used for authentication in accordance with some embodiments of the current technology.

The second secure architecture system 300 may be executed by a second component of the electronic device 100 for authentication of a first component of the electronic device 100. Generally, the second secure architecture system 300 may comprise and a second KSN generation module 310, a second dynamic key generation module 320, a second message authentication module 330, a MAC control module 340 and a decryption module 350. Each one of the modules 310, 320, 330, 340 and 350 may be executed in part or entirely by the touch screen controller 144 and/or by the secure element 152 and/or the ISA 115. As described in the example herein, the second secure architecture system 300 with the second KSN generation module 310, the second dynamic key generation module 320, the second message authentication module 330, the MAC control module 340 and the decryption module 350 and are executed by the second component of the electronic device 100, the secure element 152, for authentication of the first component of the device, the touch screen controller 144 and/or the ISA 115. In some embodiments, the secure architecture system 300 may be executed by secure software executing on the secure element 152. In other embodiments, the secure architecture system 300 may be executed by secure software executing on the ISA 115.

The second KSN generation module 310 may be used to generate a second current version of the KSN 315, the second current version of the KSN 315 being identical to the first current version of the KSN 234. The second current version of the KSN 315 may be generated in a manner identical to the first current version of the KSN 234. The second current version of the KSN 315 may be based on a second previous version of the noise 336, the second previous version of the noise 336 acquired from the memory of the secure element 152, the second previous version of the noise 336 being from a previous transaction. In some embodiments, the second current version of the KSN 315 may be further based on a second previous version of the KSN 305 acquired from the memory of the secure element 152, the second previous version of the KSN 305 being from a previous transaction. In other embodiments, the second current version of the KSN 315 for every transaction may be the result of a function that mixes the second previous version of the noise 336 and the second previous version of the KSN 305 through a number of logical or arithmetic operations such as shifting, XORing, addition, etc. As a non-limitative example of the mixing function, the second previous version of the KSN 305 may be circularly shifted by some number of bits and go through an exclusive or (XOR) operation with a second previous version of the noise 336. In some embodiments, the second current version of the KSN 315 may not only be based on the second previous version of the noise 336, but on multiple previous versions of the noise (not depicted) where a second temporary KSN (not depicted) may be defined as the second previous version of the KSN 305, and the mixing operation may be repeated several times on the second temporary KSN, whereby the temporary KSN may be shifted by some number of bits and go through a XOR operation with a different previous version of the noise each time, fork times. The second current version of the KSN 315 may then be defined as the result of this operation. The second KSN generation module 310 may further store the second current version of the KSN 315 as the second previous version of the KSN 305 in its memory for a future transaction.

The second dynamic key generation module 320, similar to the dynamic key generation module 240, may be used to generate a second current version of the second dynamic unique key 315 based on a second previous version of the second dynamic unique key 305 acquired or received from another module or component or from the memory of the second component of the electronic device 100, the secure element 152, where the second previous version of the second dynamic unique key 305 is based on an original dynamic unique key (not depicted) which may be the same as the original dynamic unique key (not depicted) in secure architecture system 200. Generally, the second dynamic key generation module 320 may function exactly as the dynamic key generation module 240 and may be used to generate a different secret key for every transaction. The second dynamic key generation module 320 may take as an input the second current version of the KSN 315 and the second previous version of the dynamic unique key 318 to generate the second current version of the dynamic unique key 305. The second dynamic key generation module 320 may employ a method to derive the second current version of the dynamic unique key 305 that is based on, adapted from, similar, or identical to that described in ANSI X.29-1, also known as the (DUKPT) method. The output of the second dynamic key generation module 320 may be used as an input to the second message authentication module 330. The second dynamic key generation module 320 may then store the second current version of the dynamic unique key 325 as the second previous version of the second dynamic unique key 305.

The second message authentication module 330 may be used to generate a control MAC 335. Generally, the second message authentication module 330 may function exactly as the message authentication module 250 to generate the control MAC 335 based on the second current version of the dynamic unique key 325 and the ciphertext 218.

The MAC control module 340 may be used to compare the MAC 252 generated by the message authentication module 250 of the first component, the touch screen controller 144, and the control MAC 335 generated by the second message authentication module 330 by the second component, the secure element 152. The MAC control module 340 may take as inputs the ciphertext 218, the MAC 252 and the control MAC 335. The MAC control module 340 may authenticate the first component and determine, based on the comparison of the MAC 252 and the control MAC 335, that the touch screen controller 144 is an authentic component and the originator of the ciphertext 218 and the MAC 252. In case the authentication is positive, the MAC control module 340 may forward the ciphertext 218 to the decryption module 350.

The decryption module 350 may be used to decrypt the ciphertext 218 generated by the touch screen controller 144. Decryption may be conditional on the MAC control module 340 having, through comparison of the MAC 252 and the control MAC 335, determined that the ciphertext 218 is authentic. The decryption module 350 may access a second key, a private key 329 stored in the secure element 152 to decrypt the ciphertext 218. The private key 329 may be associated with the public key 204. In some embodiments, a symmetric cryptosystem may be used and so the decryption module 350 may access a secret key (not depicted) present in the secure element 152 associated with a secret key (not depicted) present in the touch screen controller 144. The decryption module 350 may also obtain a second current version of the noise 207 when decrypting the ciphertext 218, and may further store the second current version of the noise 207 as the second previous version of the noise 336. The decryption module 350 may also further extract the nonce 208 from the cleartext 209.

As it may be understood, a module may be a single instruction of executable code, or many instructions of executable code, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 4:
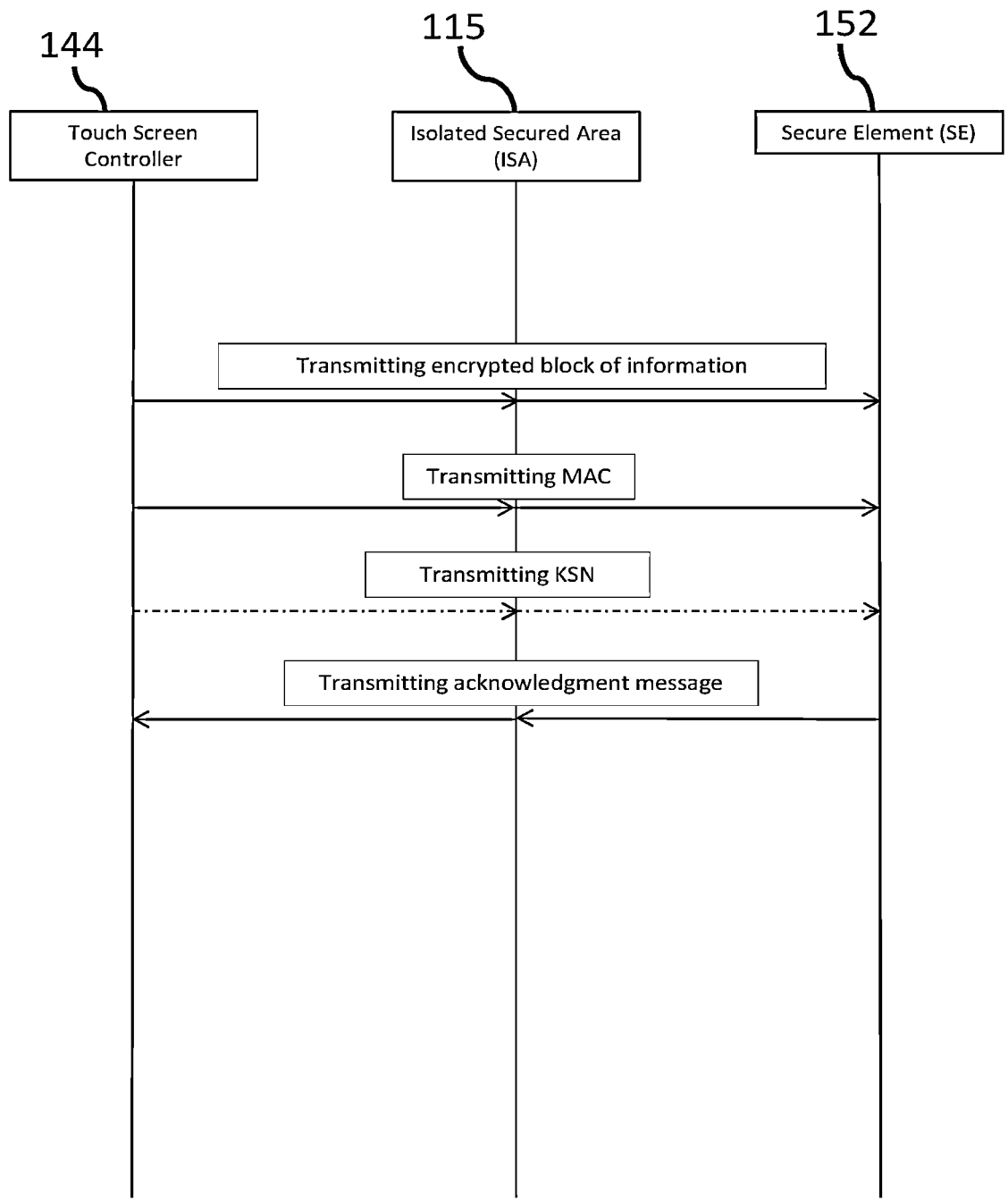
FIG. 4 is a flowchart representation of a communication flow in accordance with an embodiment of the present technology.

Reference is now made to FIG. 4, wherein a communication flow between components of a device is depicted in accordance with embodiments of the current technology.

In the embodiment illustrated in FIG. 4, the communication between the touch screen controller 144, the ISA 115 and the secure element 152 are made through SPI and/or I²C links connecting the components of the electronic device 100.

The user may have entered, with his fingers or with an electronic pencil, on the PCAP touch screen 134 superimposed on the LCD display 132, a PIC in an application of the electronic device 100 in the context of a financial transaction. The user may then have pressed a confirmation button. The touch screen controller 144 may receive and convert the analog touch events entered by the user on the PCAP touch screen 134 superimposed on the LCD display 132 into a digital signal in the form of touch event inputs. Touch event inputs may then be further processed in their digital form, for example to generate a sequence of key presses or "key block", such as KeyBlock 206, comprised in the cleartext 209.

The touch screen controller 144 may encrypt the cleartext 209 with the encryption module 210, resulting in the ciphertext 218. The touch screen controller 144 may further generate the first current version of the KSN 234 with the KSN generation module 230, generate the first current version of the dynamic unique key 242 with the dynamic key generation module 240 and generate a MAC 252 with the message authentication module 250. The touch screen controller 144 may then transmit, to the secure element 152 directly or via the ISA 115, the ciphertext 218 and the MAC 252 for authentication. In one embodiment, the touch screen controller 144 may also transmit the first current version of the KSN 234.

The secure element 152 may receive the ciphertext 218 and the MAC 252. In one embodiment, the secure element 152 may also receive the first current version of the first current version of the KSN 234. In some embodiments, the secure element 152 may interpret the ciphertext 218 and the MAC 252 as a request message (not depicted). The secure element 152 may generate a control MAC 335 based on the ciphertext 218, to authenticate the touch screen controller 144 and the ciphertext 218. If the control MAC 335 matches the MAC 252, the secure element 152 may decrypt the ciphertext 218. In some embodiments, the secure element 152 may compute an acknowledgment message (not depicted) as a response to the request message, the acknowledgment message may be based on an acknowledgment key (not depicted) and the nonce 208, as it will be explained below. The secure element 152 may then transmit, to the touch screen controller 144, directly or via the ISA 115, the acknowledgment message.

Figure 5:
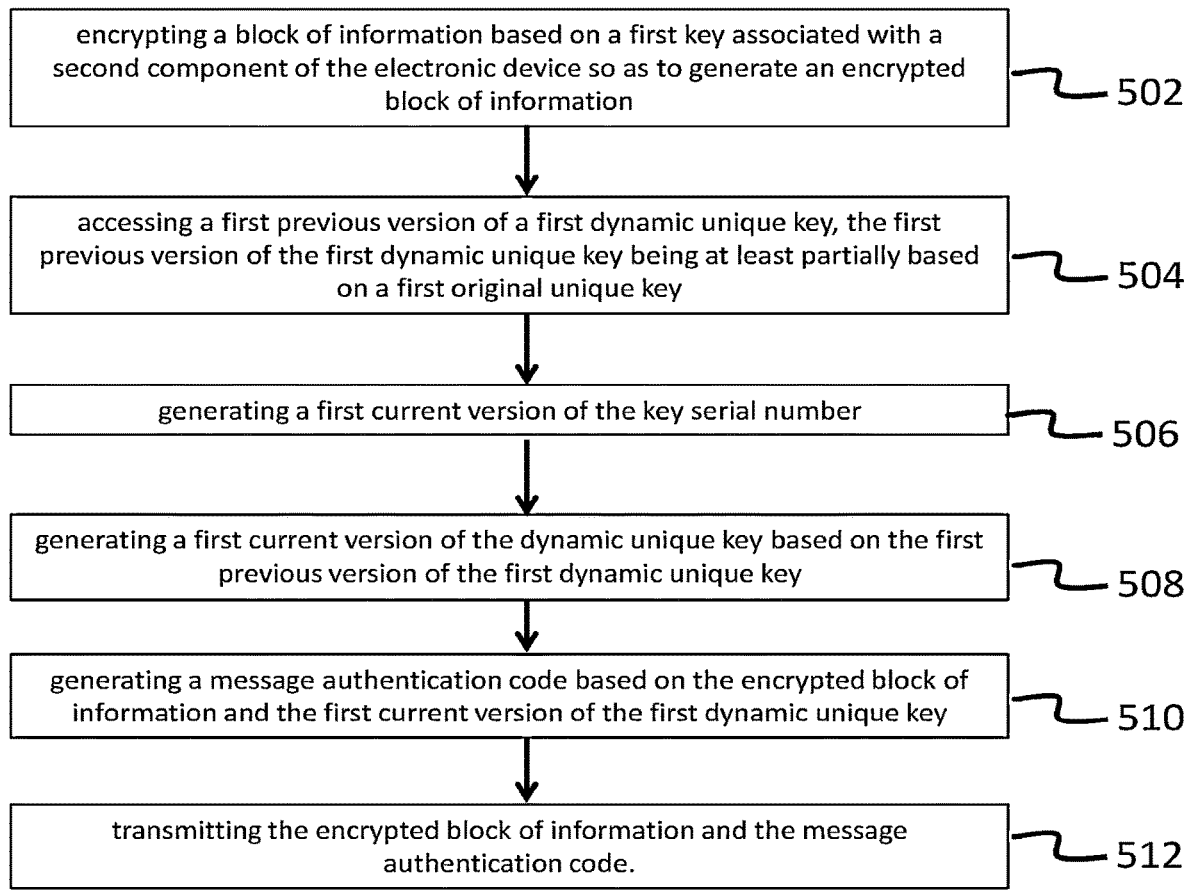
FIG. 5 is an illustration of a method carried out by a first component of an electronic device in accordance with non-limiting embodiments of the present technology.

Reference is now made to FIG. 5, wherein a method of authenticating a component of a device is depicted in the form of a flow-chart diagram in accordance with embodiments of the current technology.

The method 500 may be a first part of a method executed by the first component, the touch screen controller 144 to encrypt the block of information, the cleartext 209, and to create a message authentication code 252. The method 500 may be executed by the electronic device 100 executing the secure architecture system 200 as described in FIG. 2. In other embodiments, the method 500 may be executed by the secure element 152.

A user (not depicted) may need to enter a previously determined PIC on the electronic device 100 to confirm his identity during a transaction with a financial institution, to start a transaction with another user, or simply to access the electronic device 100 or an application on the electronic device 100. The user may enter his PIC on the electronic device 100 via the PCAP touch screen 134 superimposed on the LCD display 132. The touch screen controller 144 may convert analog touch inputs by the user on the PCAP touch screen 134 superimposed on the LCD display 132 into touch events and further process touch events to generate keying event inputs, in this case the PIC entry, by the user. After the user has pressed a confirmation key, the method 400 may start at step 502.

STEP 502: encrypting a block of information based on a first key associated with a second key stored in a second component of the electronic device so as to generate an encrypted block of information At a step 502, after having processed touch events and thereby generated the keying events, herein referred to as the KeyBlock 206, the first component, herein the touch screen controller 144, may encrypt a block of information, herein the cleartext 209 comprising the KeyBlock 206, based on an encryption key associated with a decryption key stored in a second component of the electronic device 100, herein the secure element 152, so as to generate an encrypted block of information, herein a ciphertext 218. The encryption may be performed using the RSA method following the PKCS #1 standard in the encryption module 210 by the touch screen controller 144. The touch screen controller 144 may have access to a previously generated public cryptographic key, the public key 204, and may encrypt, using the public key 204, the cleartext 209. In some embodiments, the touch screen controller 144 may concatenate a current version of the noise 207 collected from the environment of the touch screen controller 144 with the KeyBlock 206 to form the cleartext 209 to be encrypted by the encryption module 210, which outputs a ciphertext 218. In other embodiments, the touch screen controller 144 may concatenate the current version of the noise 208, a nonce 209 and the KeyBlock 206 to form the cleartext 209 to be encrypted by the encryption module 210, which outputs the ciphertext 218, as explained in FIG. 2. In some embodiments, the touch screen controller 144 may encrypt the cleartext 209 with a symmetric secret key (not depicted) using a different algorithm rather than the public key of an asymmetric public-private key pair. The method 500 may then advance to step 504.

STEP 504: accessing a first previous version of a first dynamic unique key, the first previous version of the first dynamic unique key being at least partially based on a first original unique key At a step 504, at the same time or at a different time, the touch screen controller 144 may access or acquire from its memory a first previous version of a first dynamic unique key 232, the first previous version of the first dynamic unique key 232 being at least partially based on a first original unique key (not depicted). The touch screen controller 144 may have had a first original key stored in its memory at the time of manufacturing the touch screen controller 144. The first previous version of the first dynamic unique key 232 may be derived from the first original unique key by the same method as described below. The method may 500 then advance to step 506.

STEP 506: generating a first current version of the key serial number

At a step 506, at the same time or at a different time, the touch screen controller 144 may generate the first current version of the KSN 234. The first current version of the KSN 234 may be generated by the touch screen controller 144 with the KSN generation module 230 and derived from a previous version of the noise 226, as explained in FIG. 2. In other embodiments, the first current version of the KSN 234 may be generated by the KSN generation module 230 and derived from a previous version of the KSN 228 and the previous version of the noise 226, as explained in FIG. 2. In some embodiments, the first current version of the KSN 234 may be derived from multiple previous versions of the noise (not depicted), as explained in FIG. 2. In one embodiment, the first current version of the KSN 234 may be associated with the electronic device's 100 unique identifier and a number of the transaction, and may be transferred to the dynamic key generation module 240. The method 500 may then advance to step 508.

STEP 508: generating a first current version of the dynamic unique key based on the first previous version of the first dynamic unique key At a step 508, the touch screen controller 144 may execute the dynamic key generation module 240 to generate a first current version of the dynamic unique key 242 based on the first previous version of the first dynamic unique key 232 and the first current version of the KSN 234. The first current version of the dynamic unique key 242 may be generated using a DUKPT-like method by the key generation module 240, with the previous version of the first dynamic unique key 232 and the first current version of the KSN 234 serving as inputs. At the same time or at a later time, the first current version of the KSN 234 may be stored in the memory of the touch screen controller 144 as the previous version of the KSN 228 for a future transaction. At the same time or at a later time, the first current version of the dynamic unique key 242 may be stored as the previous version of the dynamic unique key 232 for a future transaction. The method 400 may then advance to step 510.

STEP 510: generating a message authentication code based on the encrypted block of information and the first current version of the first dynamic unique key At a step 510, after having generated the ciphertext 218 with the encryption module 210 and after having obtained the first current version of the first dynamic unique key 242 from the dynamic key management module 240, the touch screen controller 144 may execute the message authentication module 250 to generate a message authentication code (MAC) 252 based on the ciphertext 218 and the first current version of the first dynamic unique key 242. The MAC 252 may be generated by the message authentication module 250 by using a cipher-based method, such as a cipher block chaining message authentication code (CBC-MAC) method, as explained in FIG. 2. In some embodiments, a cipher-based MAC (CMAC) may be used to generate the MAC 252. In other embodiments a hash-based method such as a keyed-hash MAC (HMAC) may be used to generate the MAC 252, as explained above. The method 500 may then advance to step 512.

STEP 512: transmitting the encrypted block of information 218 and the message authentication code At a step 512, the touch screen controller 144 may transmit the ciphertext 218 and the MAC 252 to the secure element 152 to authenticate the touch screen controller 144 as the originator of the ciphertext 218. In one embodiment, the touch screen controller 144 may also transmit the first current version of the KSN to the secure element 152. The method 500 may then continue as the method 600 at step 612 for the secure element 152.

Figure 6:
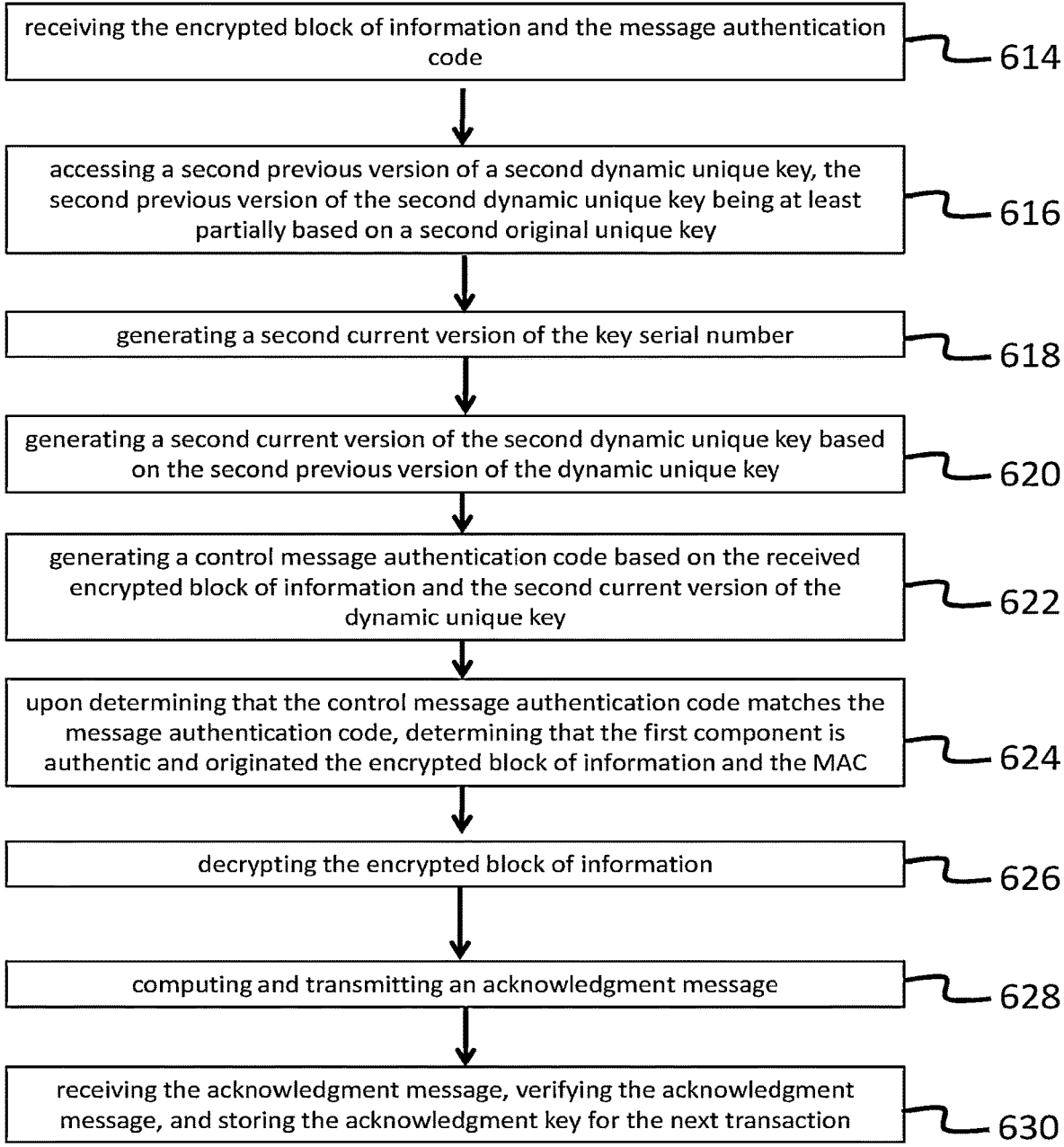
FIG. 6 is an illustration of a method carried out by a second component of an electronic device in accordance with non-limiting embodiments of the present technology.

Reference is now made to FIG. 6, wherein a method 600 of authenticating a component of a device 100 is depicted in the form of a flow-chart diagram in accordance with embodiments of the current technology.

The method 600 may directly follow the method 500. The method 600 may start in a second component of the electronic device 100, such as the secure element 152, after step 512 of the method 500. The secure element 152 may run a second secure architecture system 300, as depicted in FIG. 3, and may execute a second KSN generation module 310, a second dynamic key generation module 320, a second message authentication module 330, a MAC control module 340 and a decryption module 350. The secure element 152 may have had a second original key associated with the first original key stored in its memory at the time of manufacturing the secure element 152. In other embodiments, the method 600 may be executed by the touch screen controller 152 to authenticate the secure element 152. The method may start at step 614 for the second component.

STEP 614: receiving the encrypted block of information and the message authentication code At a step 614, the secure element 152 may receive the ciphertext 218 and the MAC 252 transmitted by the touch screen controller 144. In one embodiment, the secure element 152 may additionally receive the first current version of the KSN 234 transmitted by the touch screen controller 144. The method 600 may then continue at step 616.

STEP 616: accessing a second previous version of a second dynamic unique key, the second previous version of the second dynamic unique key being at least partially based on a second original unique key At a step 616, at the same time or at a different time, the secure element 152 may access a second previous version of a second dynamic unique key 305 located in its memory (not depicted), the second previous version of the second dynamic unique key 305 being at least partially based on a second original unique key (not depicted). The second previous version of the second dynamic unique key 305 may be identical to the first previous version of the first dynamic unique key 232. The method 600 may then advance at step 618.

STEP 618: generating a second current version of the key serial number

At a step 618, the secure element 152 may generate with the second KSN generation module 310, the second current version of the KSN 315. Generally, the second current version of the KSN 315 may be generated in a manner that is identical to the generation of the first current version of the KSN 234 by the KSN generation module 230. The second current version of the KSN 315 may have been generated by the second KSN generation module 310, and may be based on the second previous version of the noise 336 which may be identical to the first previous version of the noise 228. In some embodiments, the second current version of the KSN 315 may be further based on the second previous version of the KSN 305. In some embodiments, the second current version of the KSN 315 may be based on multiple previous versions of the noise (not depicted). In one embodiment, the second current version of the KSN 315 may be the first current version of the KSN 234 that was transmitted with the ciphertext 218 and the MAC 252. The method 600 may then advance to step 620.

STEP 620: generating a second current version of the second dynamic unique key based on the second previous version of the dynamic unique key At a step 620, the secure element 152 may execute the second dynamic key generation module 320 to generate a second current version of the second dynamic unique key 325 based on the second previous version of the dynamic unique key 318 and the second current version of the KSN 315. The second dynamic key generation module 320 may function in a manner that is identical to the dynamic key generation module 240 to generate the second current version of the second dynamic unique key 325. The second current version of the second dynamic unique key 325 may be identical to the first current version of the first dynamic unique key 242. The secure element 152 may then use the second current version of the second dynamic unique key 325 as an input for generating a control message authentication code (MAC) 335 by the message authentication module 320. At the same time or at a later time, the second current version of the KSN 315 may be stored as the second previous version of the KSN 305 in the memory of the secure element 152. The method 600 may then proceed at step 622.

STEP 622: generating a control message authentication code based on the received encrypted block of information 218 and the second current version of the second dynamic unique key;

At a step 622, the secure element 152 may execute the second message authentication module 330 to generate the control MAC 335 based on the received ciphertext 218 and the second current version of the dynamic unique key 325. The method 600 may then advance at step 624.

STEP 624: upon determining that the control message authentication code matches the message authentication code, determining that the first component is authentic and originated the encrypted block of information and the MAC At a step 624, the secure element 152 may execute the MAC control module 340 to compare the control MAC 335, which was generated based on the second version of the second dynamic unique key 325 and the second current version of the KSN 334, with the MAC 152 generated by the touch screen controller 144 and sent to the secure element 152. Upon determining that the control MAC matches the MAC 152, the secure element 152 may determine that the first component, the touch screen controller 144, is authentic and originated the ciphertext 218 and the MAC 152. The MAC control module may then transmit the ciphertext 218 to the decryption module 250. The method 600 may then advance to step 626.

STEP 626: decrypting the encrypted block of information

At a step 626, the secure element 152 may decrypt, with the decryption module 250, the ciphertext 218. The secure element 152 may have access to a second key, the private key 329 associated with the public key 204, the private key 329 allowing the secure element 152 to decrypt the ciphertext 218 by executing the decryption module 340. In some embodiments, the decryption module 340 may decrypt the ciphertext 218 with a secret key (not depicted) from its memory associated with the secret key (not depicted) located in the touch screen controller 144 and used for encrypting the ciphertext 218 to output the cleartext 209. The decryption module 340 may be further configured to split the cleartext 209 into the KeyBlock 206, the current version of the noise 207 and the nonce 208. At the same time or at a later time, the secure element 152 may store the current version of the noise 208 in its memory as the second previous version of the noise 336 for a future transaction. In some embodiments, the method 600 may end. In other embodiments, the method 600 may proceed at step 628.

In some embodiments, a request-acknowledgment (REQ-ACK) scheme may be implemented to help ensure secure processing of information by the authentic components and at the same time prevent a loss of synchronization due to message transmission failure and/or power interruptions. The first component, the touch screen controller 144, may require acknowledgment and proof that the second component, the secure element 152, has processed the MAC 252 and the ciphertext 218, and will use the current version of the noise 208 to generate a future current version of the KSN 234, before generating, at the next transaction a next authentication key (not depicted). To ensure authenticity, the second component, the secure element 152, must prove to the first component, the touch screen controller 144, that is has knowledge of the current version of the noise 234 contained in the ciphertext 218 through an associated acknowledgment message. If the acknowledgment message is correct, the secure element 152 must have decrypted the request message (the ciphertext 218) with the second key present in the secure element 152, the private key 329. Steps 628 and 630 of method 600 describe the additional steps.

STEP 628: computing and transmitting an acknowledgment message

At a step 628, the secure element 152 may compute an acknowledgment message (not depicted) with an acknowledgment key (not depicted). The acknowledgment key may be computed by performing a circular shift in which a previous version of the acknowledgment key (not depicted) may be shifted by some number of bits and go through a XOR operation with the first current version of the noise 207. The acknowledgment message may then be computed by performing an encryption operation with the acknowledgment key (not depicted) and the nonce 208 as inputs. The secure element 152 may then transmit, to the touch screen controller 144, the acknowledgment message as proof that it has correctly received and processed the encrypted block of information including the first current version of the noise 207. The secure element 152 may then store the acknowledgment key as the previous version of the acknowledgment key for a future transaction. The method 600 may then proceed at step 630.

STEP 630: receiving the acknowledgment message, verifying the acknowledgment message, and storing the acknowledgment key for the next transaction At a step 630, the touch screen controller 144 may have a pre-determined time out threshold associated with the reception of the acknowledgment message (not depicted) from the secure element 152. In the case the timeout parameter is over the pre-determined timeout threshold, the touch screen controller 144 may resend a request message in the form of the ciphertext 218 with its associated MAC 252 until the acknowledgment message is received. Once received, the touch screen controller 144 may store the acknowledgment message in its memory for comparison with a control acknowledgement message (not depicted). The touch screen controller 144 may then compute a control acknowledgement message, in the same manner as described in step 628, using a previously stored acknowledgment key (not depicted) retrieved from its memory and the current version of the noise 207. Upon determining that the received acknowledgement message matches the control acknowledgment message, the touch screen controller 144 may determine that the secure element 152 has correctly processed the current transaction and updated its internal state accordingly. The touch screen controller 144 may then store the acknowledgment key as the previous version of the acknowledgment key for a future transaction. The touch screen controller 144 may then allow the next transaction to proceed normally. The method 600 may then end.

In some embodiments, the secure element 152 may reconstitute a PIC based on KeyBlock 206 from the cleartext 209. In other embodiments, the ciphertext 218 may be transmitted to the ISA 115 before being transmitted to a remote server to finalize the transaction, wherein the remote server may act as the secure element 152.

The methods and systems described in the present disclosure may be executed and applied to any components in an electronic device. Notably, the features and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation, and without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While the above-described implementations have been described and shown with reference to particular steps performed in a particular order, it will be understood that these steps may be combined, sub-divided, or re-ordered without departing from the teachings of the present technology. The steps may be executed in concurrently or sequentially. Accordingly, the order and grouping of the steps is not a limitation of the present technology.

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A system for generating an encrypted and authenticated message for authenticating a first component of the system as an originator of the message, the system comprising:
   a processor;
   a touch screen controller;
   a non-transitory computer-readable medium comprising instructions;
   the first component comprising a first memory, the first component being operatively connected to the processor;
   a second component comprising a second memory, the second component being operatively connected to the processor and the first component;
   the processor, upon executing the instructions being configured to cause:
   receiving noise information collected from an environment of the touch screen controller;
   generating a block of information comprising the noise information;
   encrypting, at the first component, the block of information based on a first encryption key acquired from the first memory associated with a second decryption key in the second memory of the second component so as to generate an encrypted block of information;
   accessing, from the first memory, a first previous version of a first dynamic unique key, the first previous version of the first dynamic unique key being at least partially based on a first original unique key;
   generating, at the first component, a first current version of the first dynamic unique key based on the first previous version of the first dynamic unique key;
   generating, at the first component, a message authentication code (MAC) based on the encrypted block of information and the first current version of the first dynamic unique key;
   transmitting, by the first component to the second component, the encrypted block of information and the MAC;
   receiving, at the second component, the message comprising the encrypted block of information and the message authentication code;

accessing, from a second memory of the second component, a second previous version of a second dynamic unique key, the second previous version of the second dynamic unique key being at least partially based on a second original unique key and a previous version of the noise information;

generating a second current version of the second dynamic unique key based on the second previous version of the dynamic unique key;

generating, at the second component, a control MAC based on the received encrypted block of information and the second current version of the second dynamic unique key; and upon determining that the control MAC matches the MAC, determining that the message is authentic and that therefore the first component originated the message.

2. The system of claim 1, wherein the processor is further configured to cause:

receiving, at the second component, the message comprising the encrypted block of information and the message authentication code;

accessing, from the second memory, the second previous version of the second dynamic unique key, the second previous version of the second dynamic unique key being at least partially based on a second original unique key;

generating, at the second component, the second current version of the second dynamic unique key based on the second previous version of the dynamic unique key;

generating, at the second component, the control MAC based on the received encrypted block of information and the second current version of the dynamic unique key; and upon determining, at the second component, that the control MAC matches the MAC, determining that the message is authentic and that therefore the first component originated the message.

3. The system of claim 1, wherein the processor is further configured to cause: decrypting, by the second component, with the second decryption key acquired from the second memory, the second decryption key associated with the first encryption key, the encrypted block of information.

4. The system of claim 1, wherein (1) the first previous version of the first dynamic unique key and the second previous version of the second dynamic unique key are identical; and (2) the first current version of the first dynamic unique key and the second current version of the second dynamic unique key are identical.

5. The system of claim 1, wherein the first original key has been stored within the first memory of the first component at the time of manufacturing the first component, and wherein the second original key has been stored within the second memory of the second component at the time of manufacturing the second component.

6. The system of claim 1, wherein generating the first current version of the first dynamic unique key based on the first previous version of the dynamic unique key is further based on a first current version of a key serial number (KSN) and wherein generating the second current version of the second dynamic unique key based on the second previous version of the second dynamic unique key is further based on a second current version of the KSN.

7. The system of claim 1, wherein the transmitting, to the second component the encrypted block of information and the MAC further comprises transmitting a first current version of the KSN, the receiving further comprises receiving a second current version of the KSN, and wherein the second version of the KSN is the first current version of the KSN.

8. The system of claim 1, wherein the first encryption key is a public key, the second decryption key is a private key and wherein the block of information is encrypted and decrypted based on an asymmetric algorithm using the public key and the private key.

9. The system of claim 1, wherein the first encryption key is a secret key, the second decryption key is the secret key and wherein the block of information is encrypted and decrypted based on a symmetric algorithm using the secret key.

10. The system of claim 1, wherein the block of information is encrypted based on at least one of ElGamal, elliptic curve techniques, paillier cryptosystem, Rivest Shadir Adleman (RSA), and Cramer-Shoup cryptosystem.

11. The system of claim 1, wherein the first encryption key is a secret key, the second key is the secret key and the block of information is encrypted and decrypted based on at least one of Twofish, Serpent, Advanced Encryption Standard (AES), Data Encryption Standard (DES), Blowfish, CASTS, Grasshopper, Rivest Cipher 4 (RC4), Triple Data Encryption Algorithm (3DES), Skipjack, Safer+/++ and IDEA algorithm using the secret key.

12. The system of claim 1, wherein the MAC and the control MAC are generated according to a cipher block chaining message authentication code (CBC-MAC).

13. The system of claim 12, wherein the cipher block chaining message authentication code uses at least one of a DES algorithm, an AES algorithm, a Rivest Cipher 6 (RC6) algorithm, an IDEA algorithm and a 3DES algorithm.

14. The system of claim 1, wherein the MAC and the control MAC are generated according to at least one of a keyed-hash message authentication code (HMAC), cipher-based message authentication code (CMAC), a one-key CBC-MAC (CMAC) and a parallelizable message authentication code (PMAC).

15. The system of claim 1, wherein the block of information comprises one of a personal identification code (PIC) and a correspondence table of a scrambled keypad.

16. The system of claim 1, wherein the first component is one of a touch controller and an isolated secured area of a processor and the second component is a secure element.

17. The system of claim 1, wherein encrypting the block of information is
    further based on a current version of a noise acquired from the first component, a first current version of the KSN is based on a first previous version of the noise acquired from the first memory of the first component, wherein the accessing from the second memory of the second component further comprises accessing a second previous version of the noise and wherein a second current version of the KSN is based on the second previous version of the noise and wherein the processor is further configured to cause:
    storing, in the first memory of the first component, the first current version of the noise as the first previous version of the noise; and
    storing, in the second memory of the first component, the second current version of the noise as the second previous version of the noise.

18. The system of claim 1, wherein a first current version of the KSN is further based on a first previous version of the KSN, a second current version of the KSN is further based on a second previous version of the KSN and wherein the processor is further configured to cause:

storing, in the first memory of the first component, the first current version of the KSN as the first previous version of the KSN; and storing, in the second memory of the first component, the second current version of the KSN as the second previous version of the KSN.

19. The system of claim 1, wherein a key serial number is based on multiple previous versions of the noise.

20. A system for generating an encrypted and authenticated message for authenticating a first component of the system as an originator of the message, the system comprising:

a processor;

a non-transitory computer-readable medium comprising instructions;

the first component comprising a first memory, the first component being operatively connected to the processor;

a second component comprising a second memory, the second component being operatively connected to the processor and the first component;

the processor, upon executing the instructions being configured to cause:

receiving noise information;

generating a block of information comprising the noise information;

encrypting, at the first component, the block of information based on a first encryption key acquired from the first memory associated with a second decryption key in the second memory of the second component so as to generate an encrypted block of information;

accessing, from the first memory, a first previous version of a first dynamic unique key, the first previous version of the first dynamic unique key being at least partially based on a first original unique key;

generating, at the first component, a first current version of the first dynamic unique key based on the first previous version of the first dynamic unique key;

generating, at the first component, a message authentication code (MAC) based on the encrypted block of information and the first current version of the first dynamic unique key;

transmitting, by the first component to the second component, the encrypted block of information and the MAC;

receiving, at the second component, the message comprising the encrypted block of information and the message authentication code;

accessing, from a second memory of the second component, a second previous version of a second dynamic unique key, the second previous version of the second dynamic unique key being at least partially based on a second original unique key and a previous version of the noise information;

generating a second current version of the second dynamic unique key based on the second previous version of the dynamic unique key;

generating, at the second component, a control MAC based on the received encrypted block of information and the second current version of the second dynamic unique key;

upon determining that the control MAC matches the MAC, determining that the message is authentic and that therefore the first component originated the message;

wherein encrypting the block of information is further based on a nonce, and wherein the processor is further configured to cause, after generating the second current version of the second dynamic unique key based on the second previous version of the dynamic unique key:

accessing, from the second memory of the second component, a previous acknowledgment key;

generating, at the second component, a current acknowledgment key based on the previous acknowledgment key and the noise;

generating, at the second component, a current acknowledgment message based on the current acknowledgment key and the nonce; and transmitting, to the first component, the current acknowledgment message.

21. A system for generating an encrypted and authenticated message for authenticating a first component of the system as an originator of the message, the system comprising:

a processor;

a touch screen controller;

a non-transitory computer-readable medium comprising instructions;

the first component comprising a first memory, the first component being operatively connected to the processor;

a second component comprising a second memory, the second component being operatively connected to the processor and the first component;

the processor, upon executing the instructions being configured to cause:

receiving noise information collected from an environment of the touch screen controller;

generating a block of information comprising the noise information;

encrypting, at the first component, the block of information based on a first encryption key acquired from the first memory associated with a second decryption key in the second memory of the second component so as to generate an encrypted block of information;

accessing, from the first memory, a first previous version of a first dynamic unique key, the first previous version of the first dynamic unique key being at least partially based on a first original unique key;

generating, at the first component, a first current version of the first dynamic unique key based on the first previous version of the first dynamic unique key;

generating, at the first component, a message authentication code (MAC) based on the encrypted block of information and the first current version of the first dynamic unique key;

transmitting, by the first component to the second component, the encrypted block of information and the MAC;

receiving, at the second component, the message comprising the encrypted block of information and the message authentication code;

accessing, from a second memory of the second component, a second previous version of a second dynamic unique key, the second previous version of the second dynamic unique key being at least partially based on a second original unique key and a previous version of the noise information;

generating a second current version of the second dynamic unique key based on the second previous version of the dynamic unique key;

generating, at the second component, a control MAC based on the received encrypted block of information and the second current version of the second dynamic unique key;

upon determining that the control MAC matches the MAC, determining that the message is authentic and that therefore the first component originated the message;

encrypting the block of information is further based on a nonce; and the processor is further configured to cause generating a block of information comprising a concatenation of the nonce and the noise.

* * * * *